TELEPHONE SYSTEM OF THE COIN CONTROLLED TYPE

Filed July 17, 1952 16 Sheets-Sheet 1

INVENTOR
A. E. JOEL, JR.
BY A. F. Kane
ATTORNEY

TELEPHONE SYSTEM OF THE COIN CONTROLLED TYPE

Filed July 17, 1952 16 Sheets-Sheet 2

INVENTOR
A. E. JOEL, JR.
BY
A. F. Kane
ATTORNEY

Sept. 4, 1956 A. E. JOEL, JR 2,761,900

TELEPHONE SYSTEM OF THE COIN CONTROLLED TYPE

Filed July 17, 1952 16 Sheets-Sheet 3

INVENTOR
A. E. JOEL, JR.
BY
A. F. Kane
ATTORNEY

TELEPHONE SYSTEM OF THE COIN CONTROLLED TYPE

Filed July 17, 1952 16 Sheets-Sheet 4

INVENTOR
A. E. JOEL, JR.
BY A. F. Kane
ATTORNEY

TELEPHONE SYSTEM OF THE COIN CONTROLLED TYPE

INVENTOR
A. E. JOEL, JR.
BY
A. F. Kane
ATTORNEY

INVENTOR
A. E. JOEL, JR.
BY
A. F. Kane
ATTORNEY

TELEPHONE SYSTEM OF THE COIN CONTROLLED TYPE

Filed July 17, 1952 16 Sheets-Sheet 7

INVENTOR
A. E. JOEL, JR.
BY G. F. Kane
ATTORNEY

INVENTOR
A. E. JOEL, JR.
BY
G. F. Kane
ATTORNEY

INVENTOR
A. E. JOEL, JR.
BY A. J. Kane
ATTORNEY

TELEPHONE SYSTEM OF THE COIN CONTROLLED TYPE

INVENTOR
A. E. JOEL, JR.
BY
A. F. Kane
ATTORNEY

Sept. 4, 1956 A. E. JOEL, JR 2,761,900

TELEPHONE SYSTEM OF THE COIN CONTROLLED TYPE

Filed July 17, 1952 16 Sheets-Sheet 11

INVENTOR
A. E. JOEL, JR.
BY *A. F. Kane*
ATTORNEY

TELEPHONE SYSTEM OF THE COIN CONTROLLED TYPE

Filed July 17, 1952 16 Sheets-Sheet 12

INVENTOR
A. E. JOEL, JR.
BY G. F. Kane
ATTORNEY

INVENTOR
A. E. JOEL, JR.
BY G. F. Kane
ATTORNEY

INVENTOR
A. E. JOEL, JR.
BY G. F. Kane
ATTORNEY

Sept. 4, 1956 A. E. JOEL, JR 2,761,900

TELEPHONE SYSTEM OF THE COIN CONTROLLED TYPE

Filed July 17, 1952 16 Sheets-Sheet 15

INVENTOR
A. E. JOEL, JR.
BY
A. F. Kane
ATTORNEY

Sept. 4, 1956 A. E. JOEL, JR 2,761,900

TELEPHONE SYSTEM OF THE COIN CONTROLLED TYPE

Filed July 17, 1952 16 Sheets-Sheet 16

INVENTOR
A.E.JOEL,JR.
BY
A. F. Kane
ATTORNEY

United States Patent Office 2,761,900
Patented Sept. 4, 1956

2,761,900

TELEPHONE SYSTEM OF THE COIN CONTROLLED TYPE

Amos E. Joel, Jr., South Orange, N. J., assignor to Bell Telephone Laboratories, Incorporated, New York, N. Y., a corporation of New York Application July 17, 1952, Serial No. 299,377

11 Claims. (Cl. 179—6.3)

This invention relates to telephone systems and more particularly to automatic telephone systems in which calls originating at dial stations equipped with coin boxes are charged against the calling party through the collection of deposited coins or tokens.

In Patent 2,357,576 granted September 5, 1944, to C. E. Brooks and E. W. Flint there is disclosed a system of the general character defined above which embodies improvements over dial switching telephone systems of the usual type and which serves to reduce to a minimum the services of an operator in supervising toll calls for the purpose of collecting and refunding coins or tokens deposited by the calling party in accordance with the tariff rates for initial and overtime periods of conversation on such calls. In the system of the aforenoted patent all short haul, low tariff calls from coin box lines are directed to a trunk outgoing to a tandem office, such trunks having separate appearances in the banks of district or office selectors and separate lamp and jack appearances at the "A" operator's switchboard for each tariff rate. On the initiation of a call from a coin box line the calling party first deposits a coin to enable the call to be started and after receiving the usual dial tone proceeds to dial the directory number of the wanted line. The office code and numerical digits of the line number thus dialed are registered in the sender of the calling office and in accordance with the office code digits registered, a district and, if required, an office selector are set to select an idle trunk extending to a tandem office. The office code determines over which one of its district selector or office selector appearances the tandem trunk will be seized, that is, the appearance which is allocated to the proper tariff rate for the desired connection.

At the tandem office, upon seizure of the trunk, a connection is established with an idle tandem sender, following which the sender of the of the originating office is signaled to transfer the office code and numerical digit registrations of the wanted line number to registers of the tandem sender. After the number has been completely transferred, the proper charge rate lamp corresponding to the appearance over which the trunk was seized is lighted at the "A" switchboard and the "A" operator then plugs one of her cord circuits into the jack associated with the lighted lamp, whereupon the coin initially deposited is refunded and the lighted charge rate lamp is extinguished. The operator then requests the calling party to deposit coins in the amount indicated by the charge rate lamp which was lighted and after hearing the deposit of such coins, disconnects her cord circuit from the jack. When she disconnects her cord circuit from the jack the tandem sender is signaled to proceed to control the completion of the connection to the wanted line in accordance with the digit information registered therein.

When the called subscriber answers, the timing of the call is initiated and after four and one-half minutes the deposited coins are collected. After five minutes the proper charge rate lamp is flashed to indicate to the operator that an overtime interval has been reached. The operator again plugs a cord circuit into the jack associated with the flashing lamp and directs the calling party to signal her when he is through talking. In most cases the subscriber will elect to terminate the conversation at once. If he does not do so, however, the operator leaves the plug of the cord circuit in the trunk jack, writes a ticket and handles the call in the well-known manner. It is apparent that, while the services of the operator on calls of the type described are considerably reduced over those required of an operator under usual practice, such services are not entirely eliminated since the continued supervision of the operator is required during any of the overtime periods during which conversation is continued, and since it is necessary also for the operator to come in on the connection before it is completed to the desired destination in order to request the calling party to deposit coins in accordance with the tariff rate prescribed for the initial period of conversation.

In my copending application, Serial No. 113,642, filed September 1, 1949, which was issued April 20, 1954, as Patent 2,676,209, there is disclosed a system of telephone communication of the general type described above and in which the need for operators on toll calls originated at coin box stations is eliminated and the acts heretofore performed by an operator on such calls in requesting for, collecting and refunding coins or tokens are performed automatically.

In the system of the copending application a plurality of message bearing devices, such as magnetic tape-type telegraphones, are provided, each corresponding to a particular set of bank terminals in which a tandem trunk terminates, and each bearing a request pronouncement for the deposit of coins in the value of the tariff rate determined by its corresponding set of bank terminals over which the trunk is seized in response to the dialing of the telephone designation of a particular called line.

Also, in the system of the copending application, coin-controlled signal generators are employed at the coin box station which function to identify each coin deposited thereat by a distinctive combination of two frequencies which operate selectively responsive means for registering such coin deposits. Cooperating selector switches and a coin adding and register circuit function automatically to totalize the values of the coins deposited; to check the amount deposited for the initial period of conversation against the prescribed tariff rate for such period; and to control the completion of an initiated call only when the totalized value of the deposited coins corresponds to the prescribed tariff rate.

Also, in the system of the copending application, there are provided means under control of the totalizing selector switches which function to transfer the initiated call to an operator in the event the calling party fails to deposit the amount of tariff indicated by the telegraphone pronouncement automatically transmitted to the calling station on a toll call originated thereat and which function also to automatically advise the connected operator of the prescribed tariff rate. After the initial period of conversation has terminated, the calling subscriber is requested automatically to deposit additional coins for overtime service and the value of such coins, if deposited, is registered and checked against the tariff rate prescribed for such overtime service. Also, a timing-out circuit is employed which functions, a predetermined interval of time after a coin deposit has been requested and has not been made, to automatically bring in an operator on the connection.

It is the object of this invention to enlarge the scope of and to otherwise improve telephone systems of the type disclosed in my copending application, above identified.

This object is attained in accordance with a feature of the invention by the provision of means whereby the request for and collection of overtime charges are instituted by the disconnect of either the called or calling parties to a toll connection and whereby, if the calling party disconnects, ringing current is applied to the line in an attempt to recall him. If, after a brief period this automatic recall is not responded to, the connection is set up to a coin control circuit which immediately calls in a monitoring operator. If the calling party remains at his telephone and only the called party disconnects the coin control circuit is immediately connected.

In accordance with another feature of the invention a common charge-rate translator link circuit is employed wherein connections from the trunk to coin control circuits are first set up through the common link and thereafter the connections are maintained independent of the common link by individual links served by a common group of control circuits.

A further feature of the invention resides in the use of a gradual rate change circuit the purpose of which is to permit a change to take place in the charge rates for different telephone calls in a manner such that calls originated prior to the rate change and in progress at the time rates are changed will have their charges computed at the rates in effect prior to the change.

These and other features of the invention will be readily understood from the following description when read with reference to the accompanying drawings, in which:

Fig. 1 shows, in the upper section thereof, a coin box line terminating in a panel type office, a line finder, district selector, office selector and sender of which are schematically illustrated; shows, in the lower portion thereof a coin box line terminating in an office of the well-known cross bar type, the line switch, district and office selector frames, sender link switch frame, sender and marker of which are indicated by suitably labeled boxes; shows, in the right portion thereof the selector switch appearances of the outgoing end of a trunk extending from the originating office to a tandem office; and shows, schematically, at the extreme left, the coin-operated signal generators associated with each of the coin box lines illustrated;

Figs. 2, 4 and 5 taken together show the outgoing end of a tandem trunk;

Figures 1, 18:
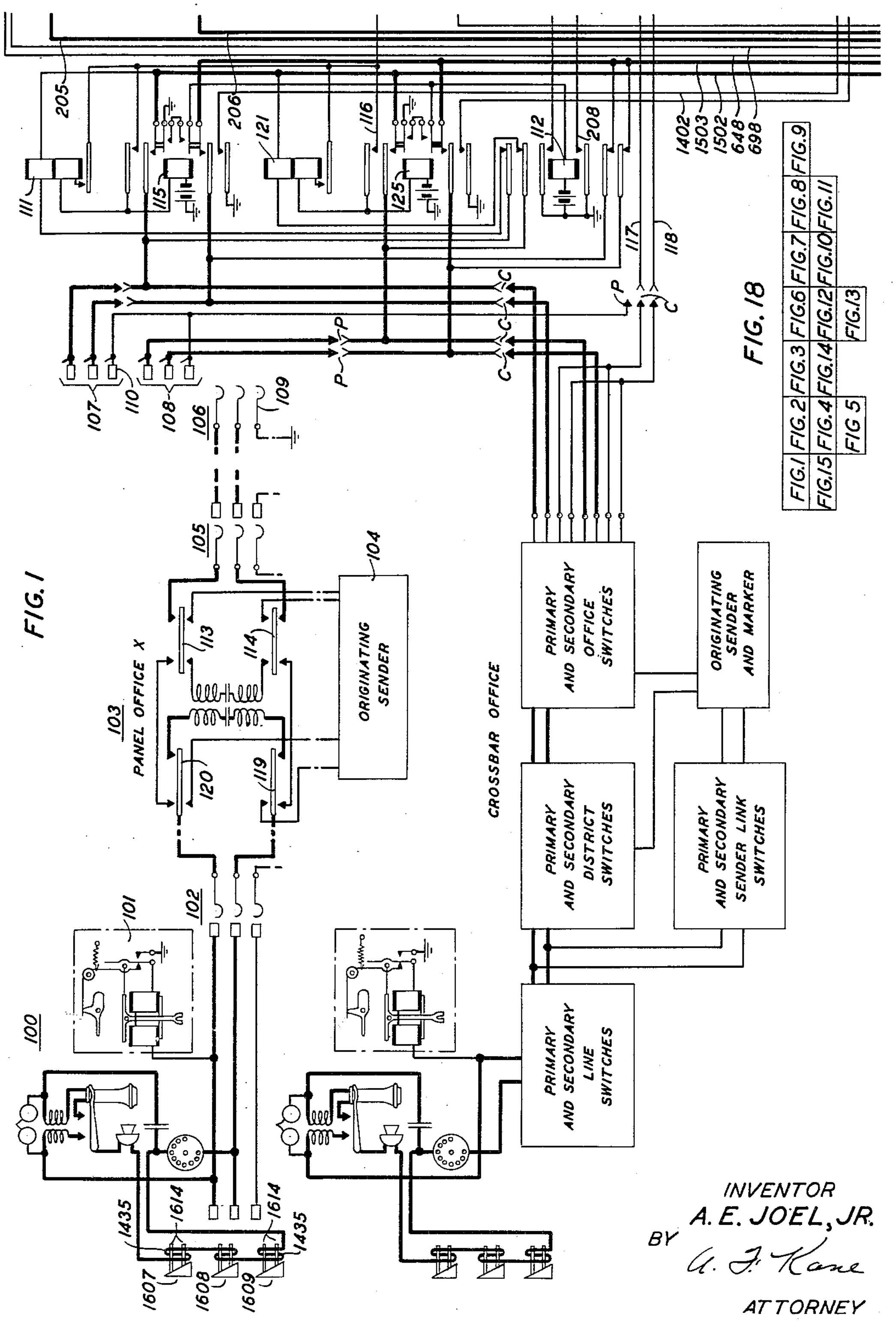
Figure 2:
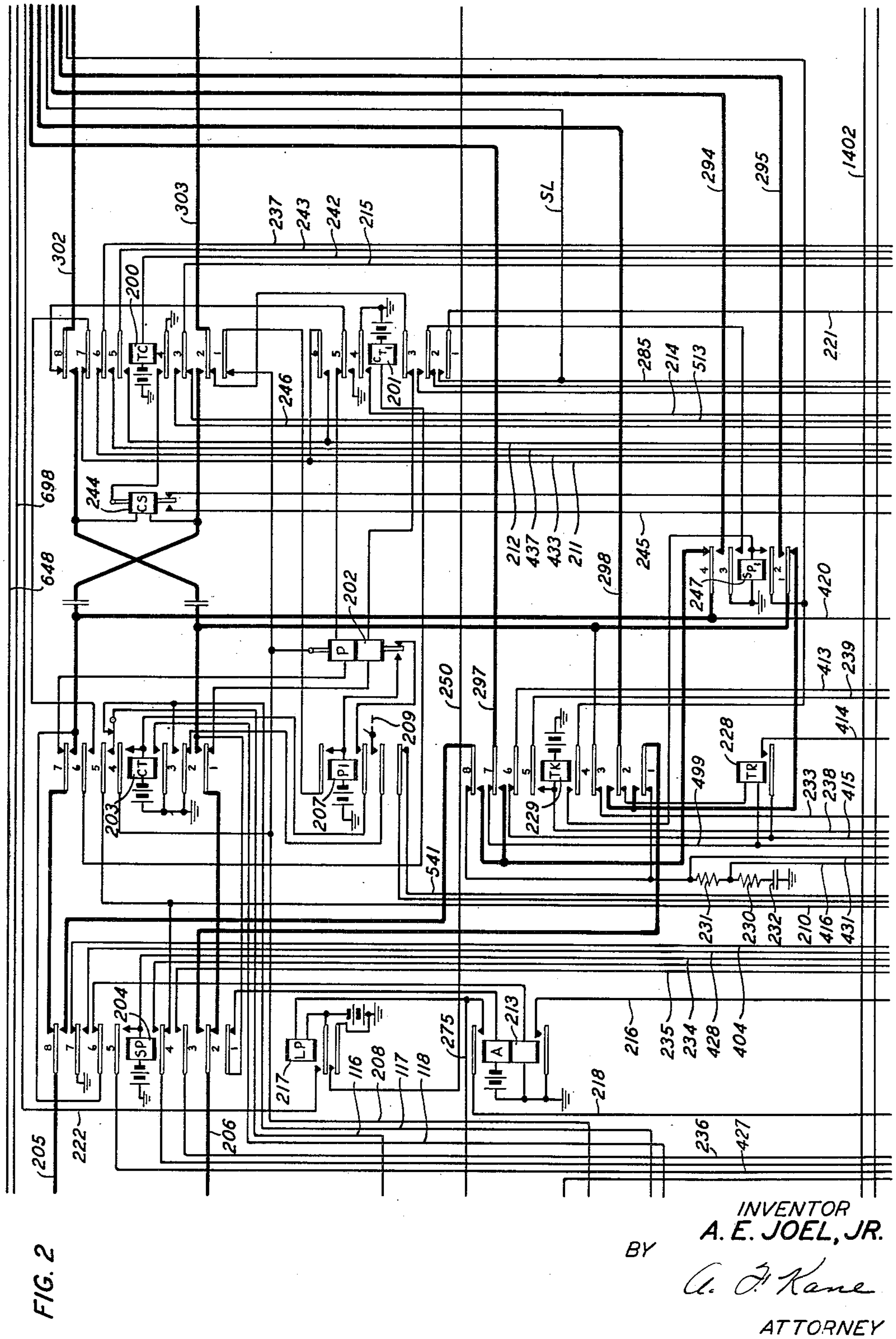
Figure 6:
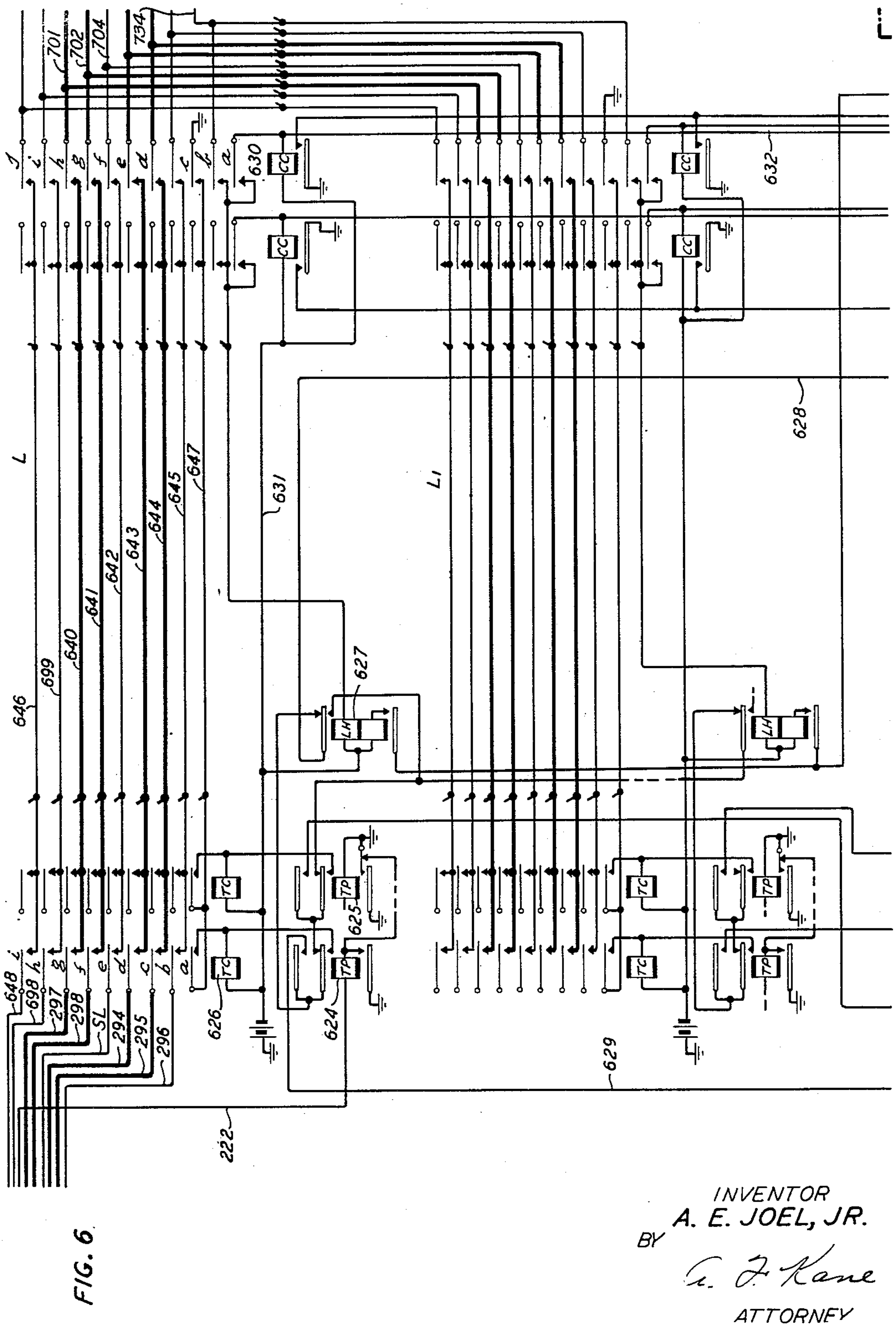
Fig. 6 shows schematically, a pair of link circuits each individual to a particular tandem trunk and to which the tandem trunks have access and which function to extend a trunk to a common coin-controlled pronouncement circuit.
Figure 8:
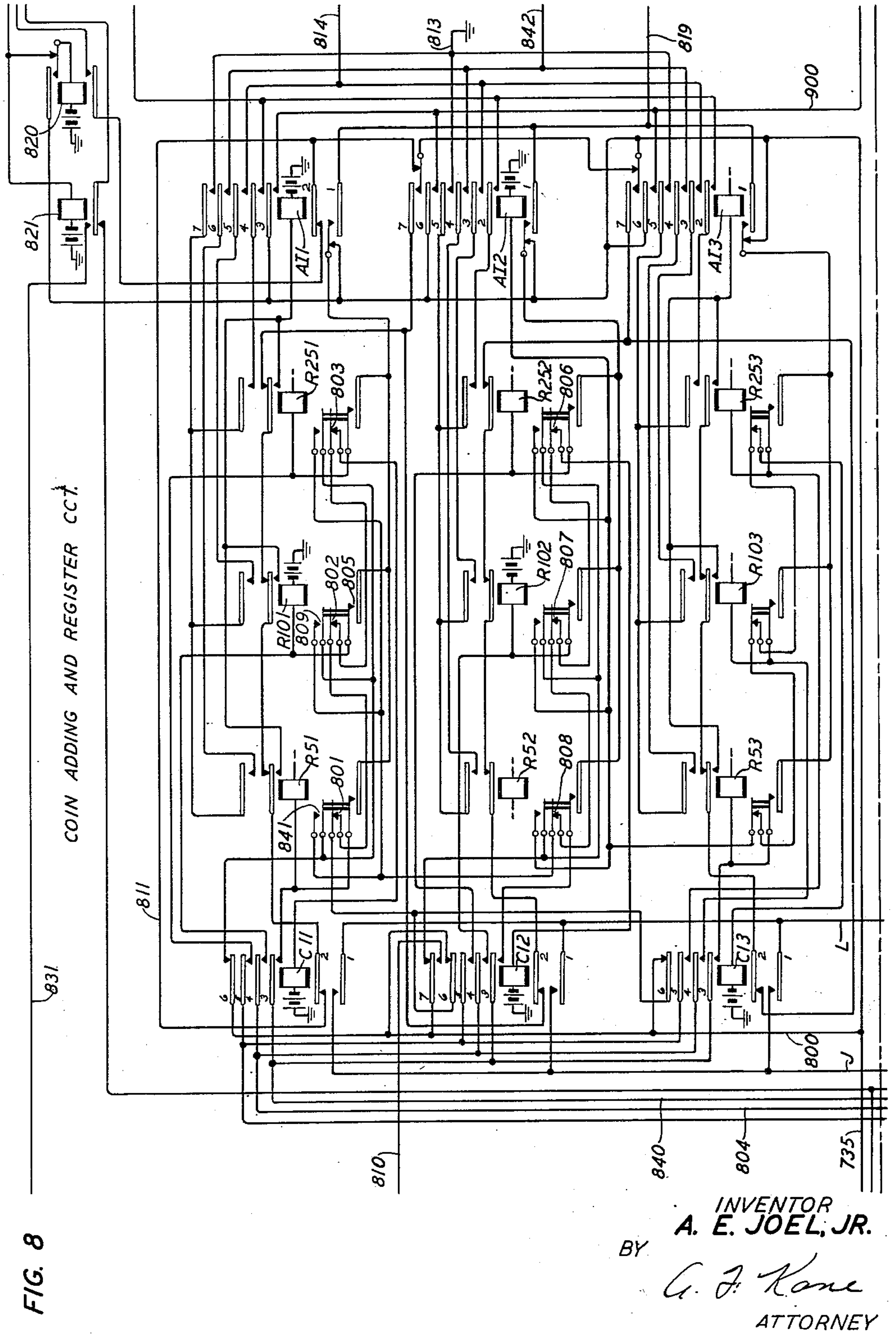
Figure 9:
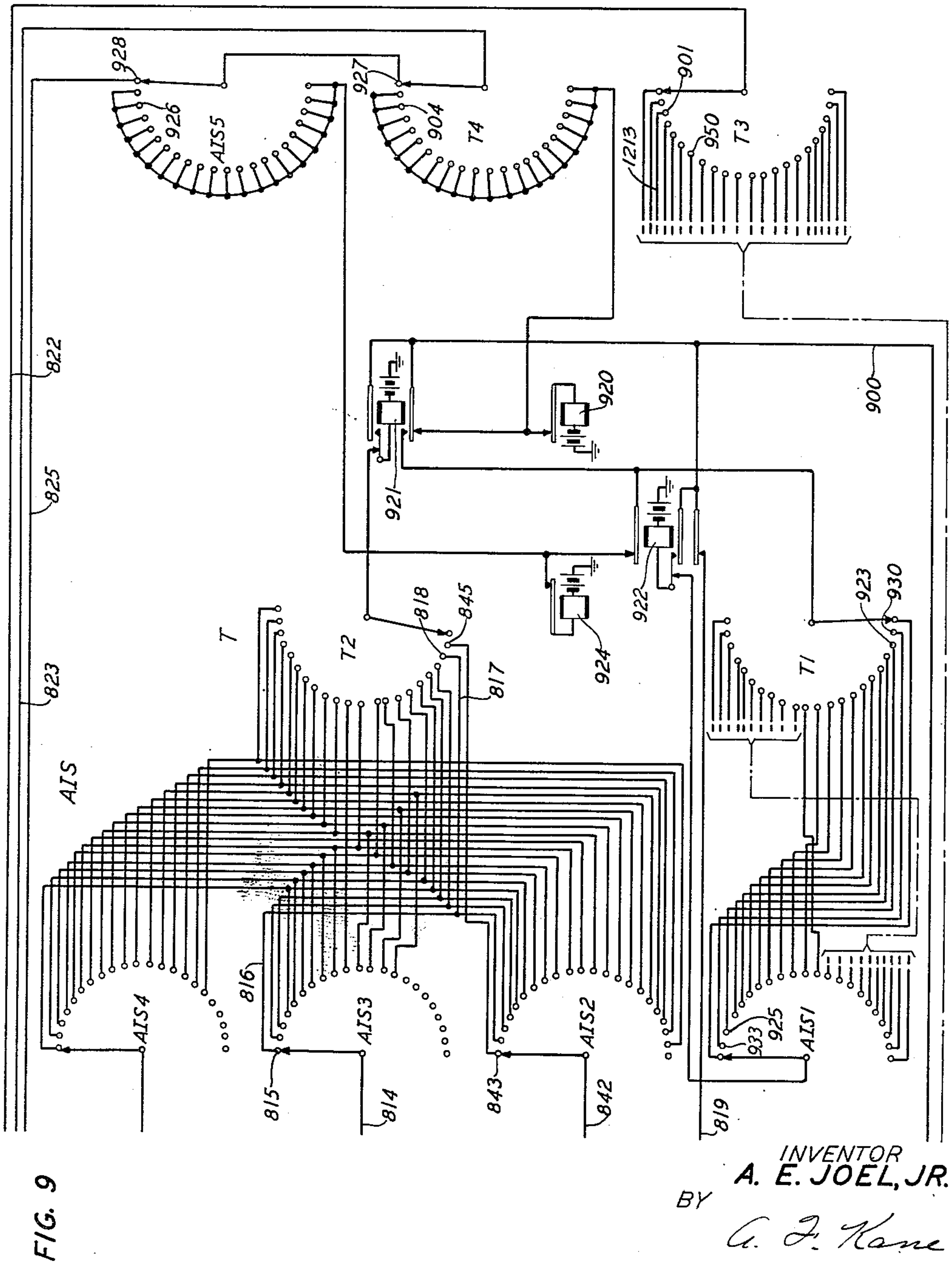
Figure 10:
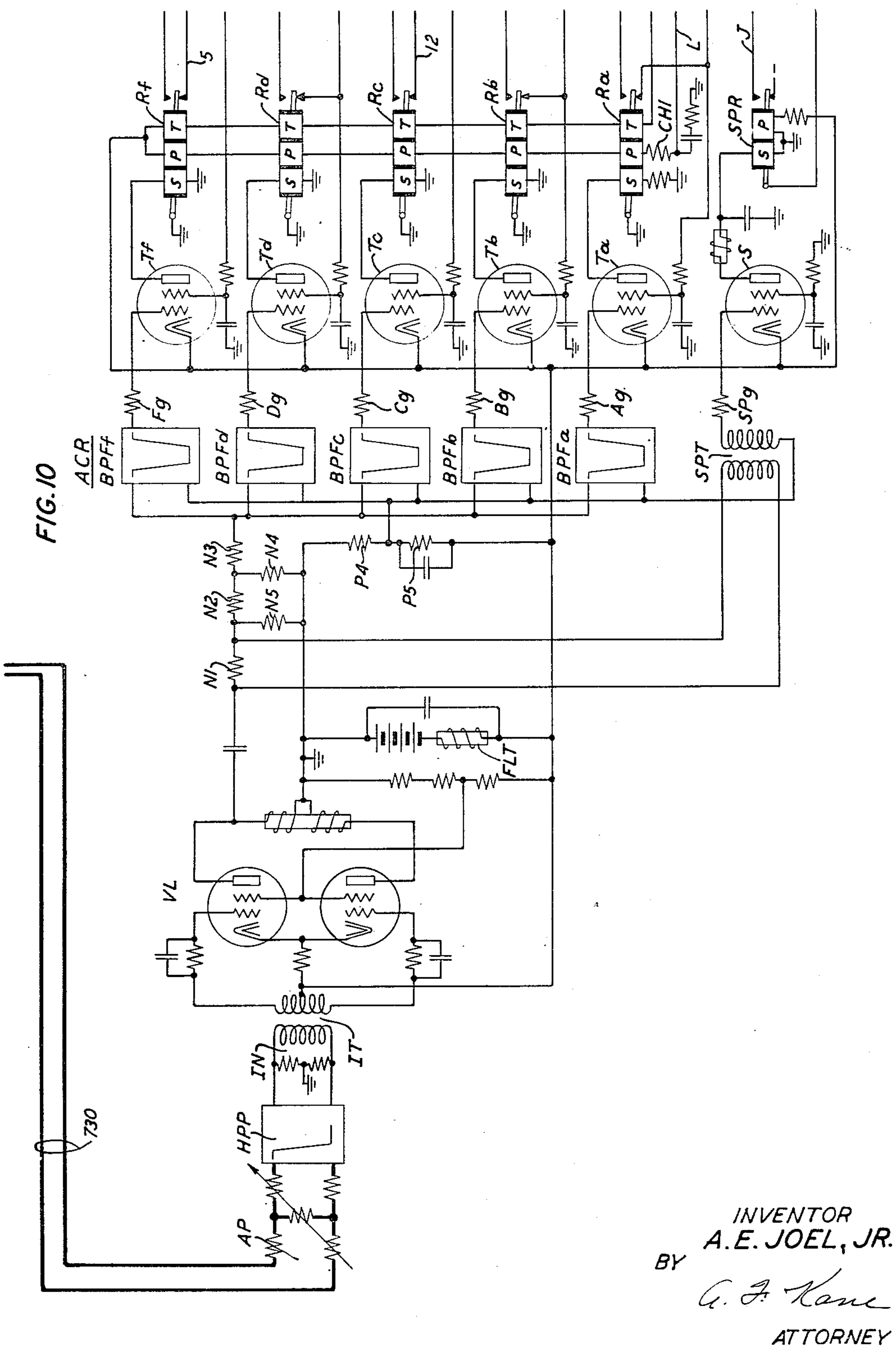
Figure 11:
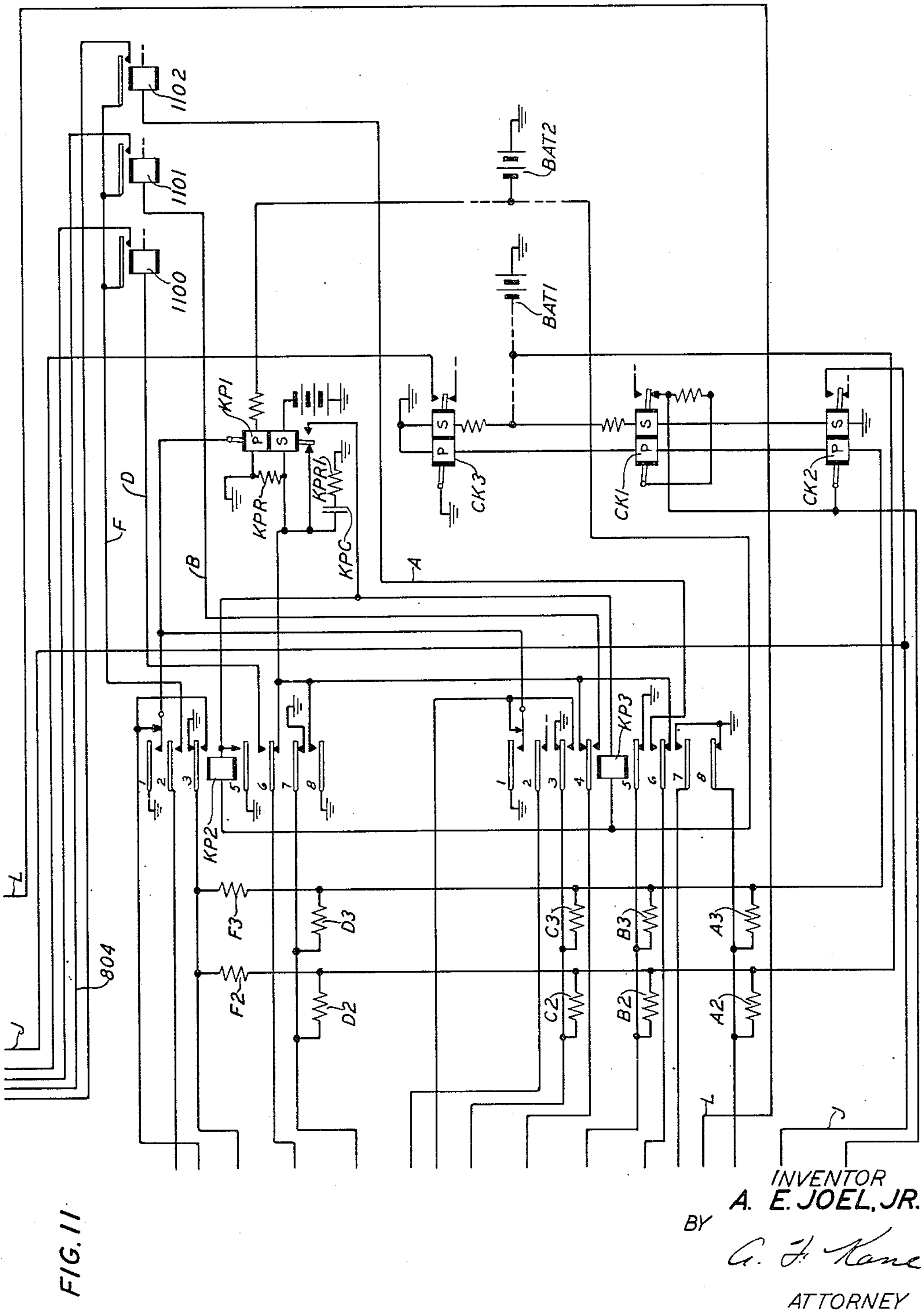
Figure 12:
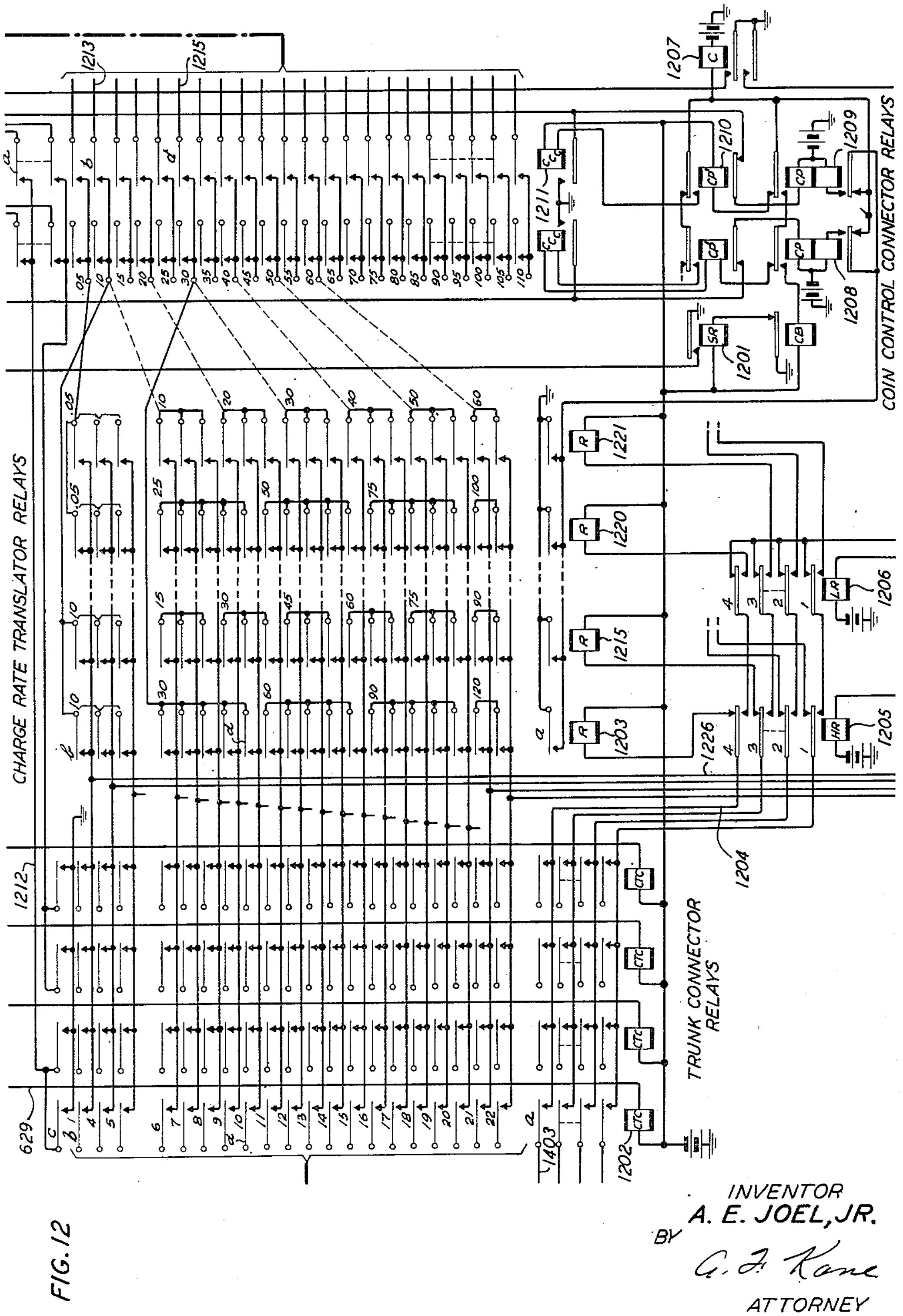
Figure 13:
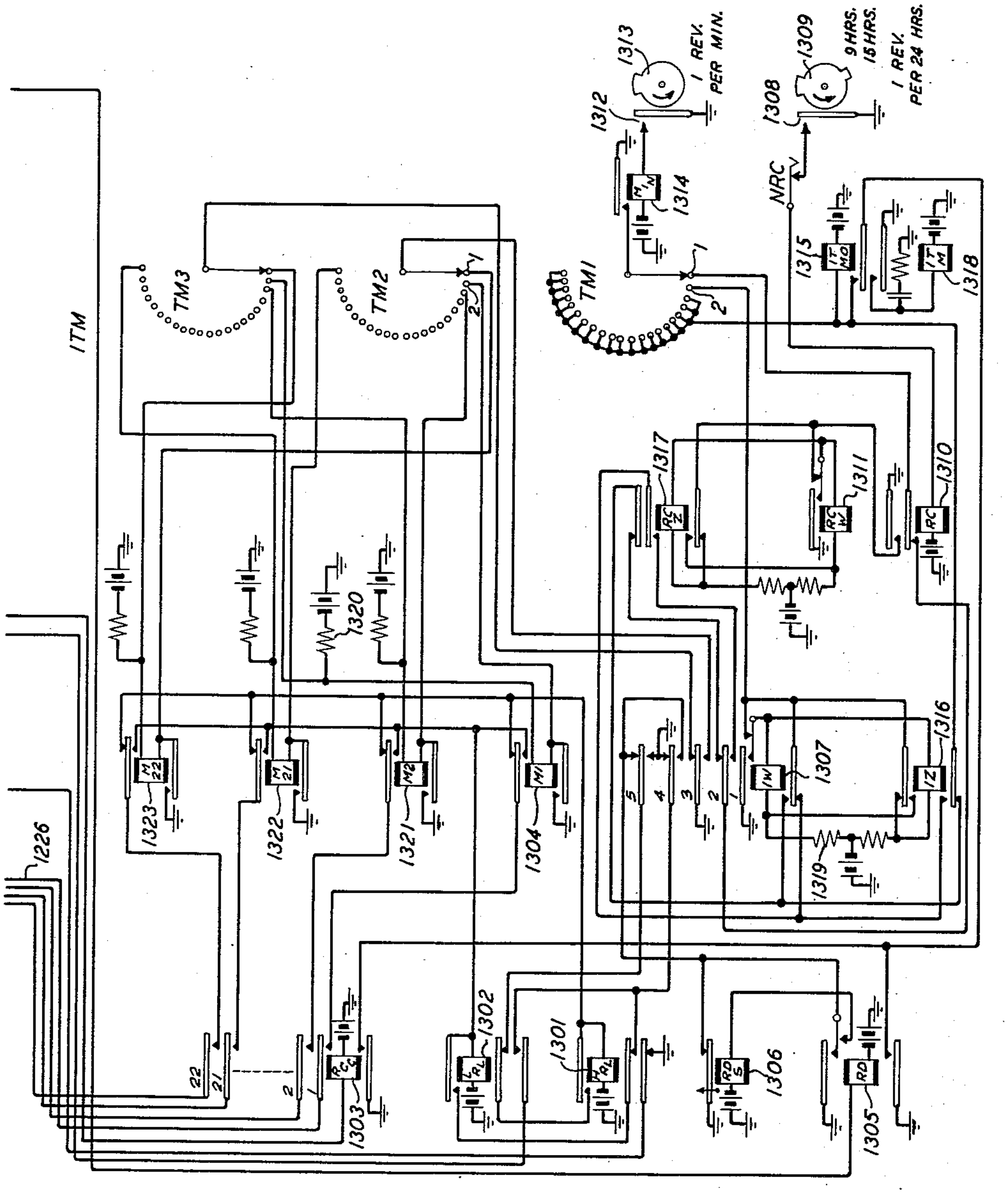
Figure 14:
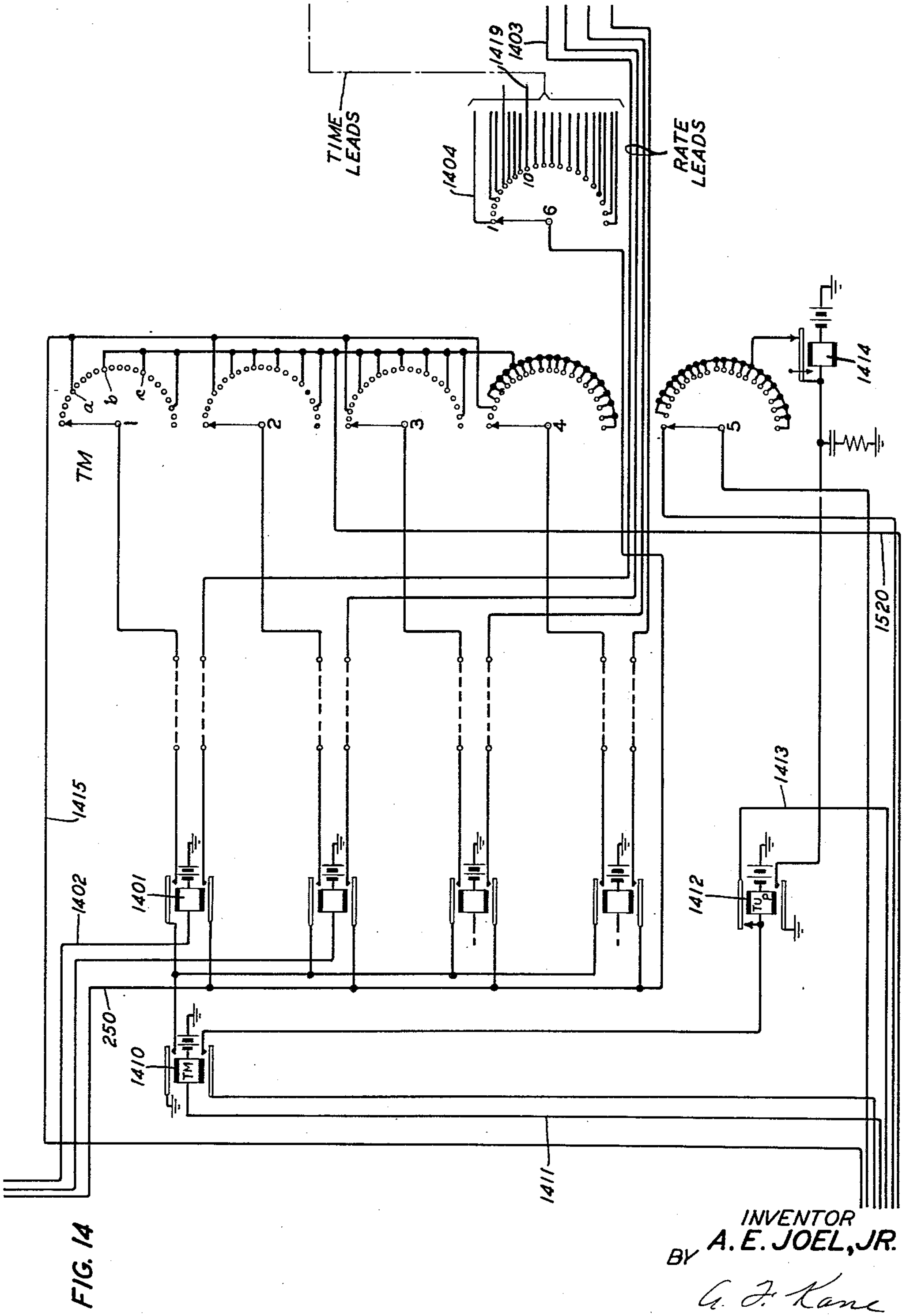
Figure 15:
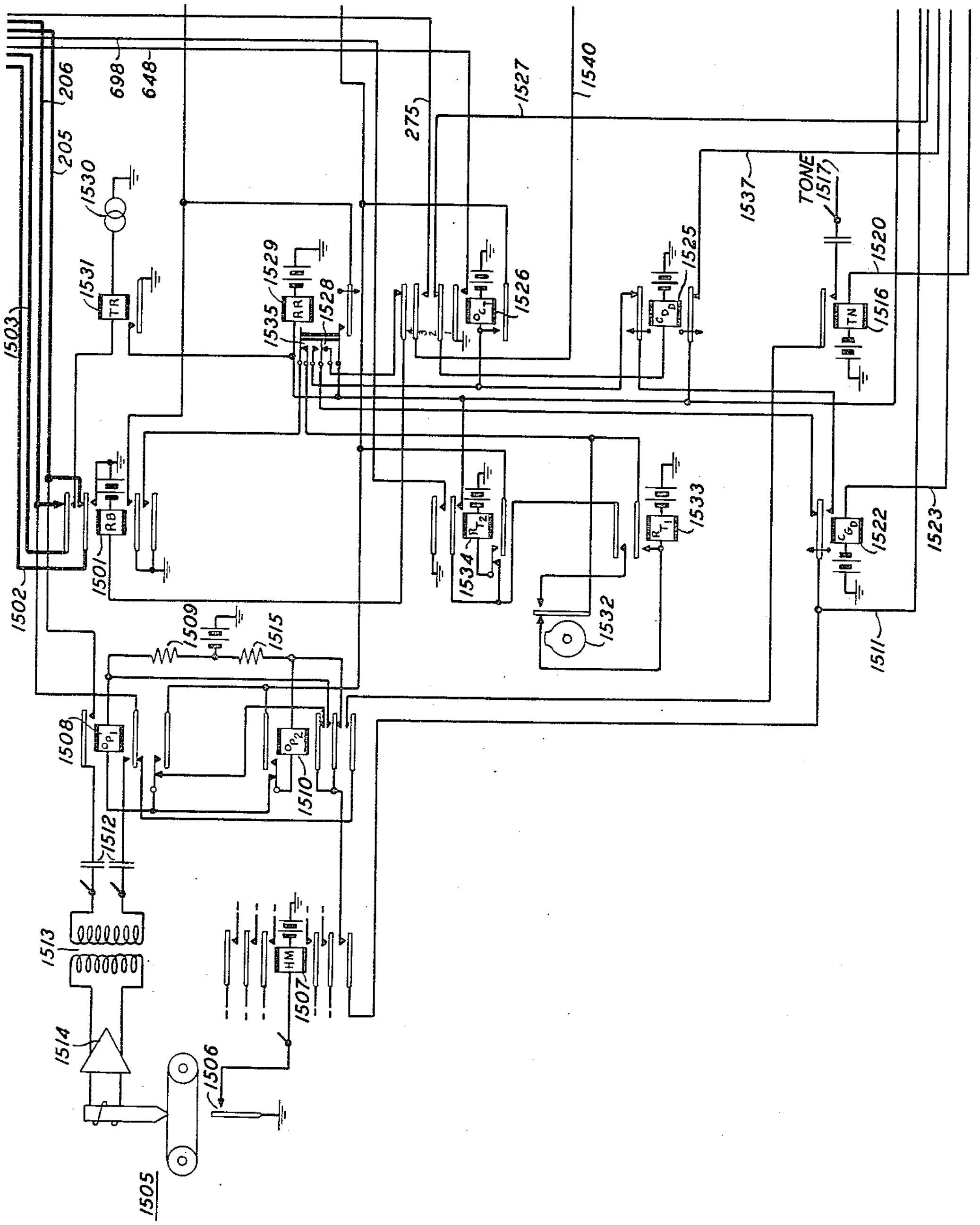
Figure 17:
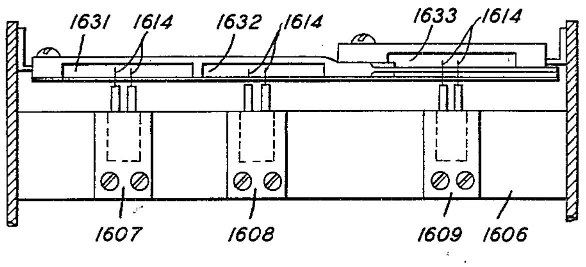
Figure 16:
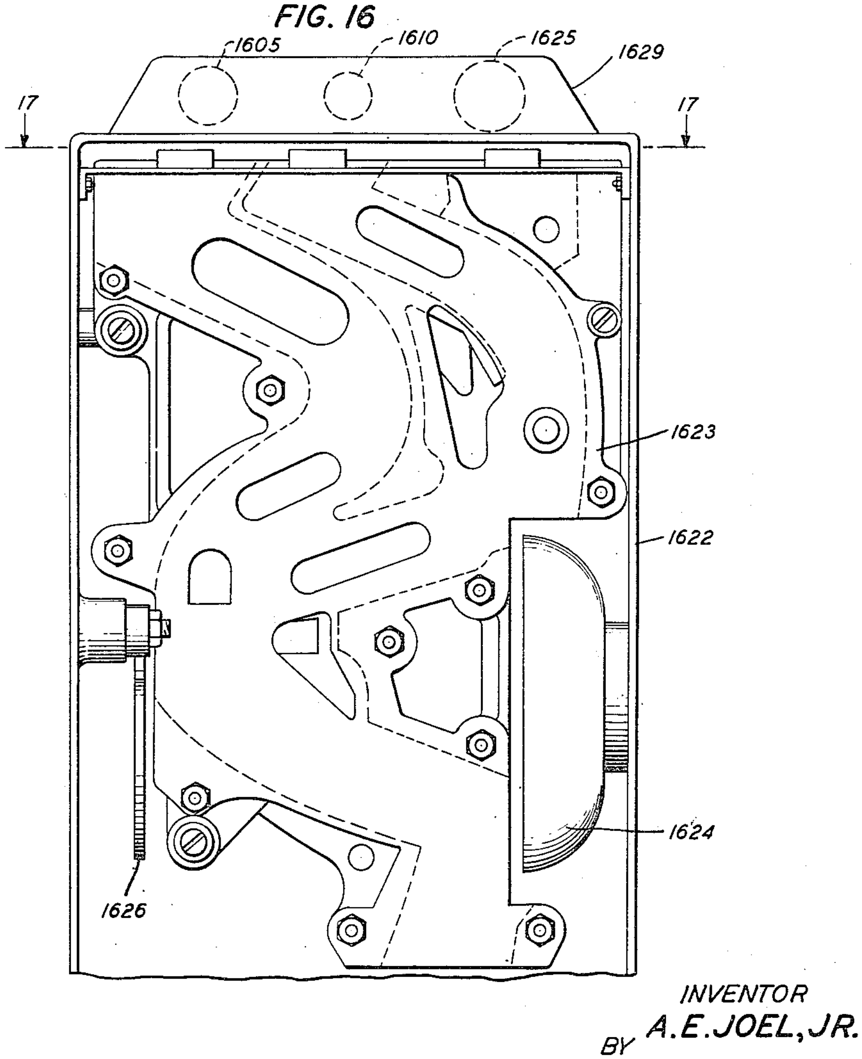

Fig. 8 shows diagrammatically a coin register and adding circuit which functions under control of an alternating-current signal receiver, Figs. 10 and 11, to recognize and register the deposits of nickels, dimes and quarters at a calling station and to condition the totalizing selectors, Fig. 9, accordingly, so as to enable them to totalize the values of the coins deposited at the calling station and to check such deposits against the tariff rate prescribed for initial and overtime periods of conversation on a call originated at a coin box station;

Fig. 9 illustrates diagrammatically the totalizing selectors which function to totalize the values of coins deposited at a calling station; to check the total against the prescribed tariff rates; and to direct the initiated call to a monitoring operator's position in the event the amount totalized does not check with the required tariff rates, or to permit the call to advance to completion when the value of the deposited coins checks with the prescribed tariff rates;

Figs. 10 and 11 constitute an alternating-current signal receiver which functions to detect the frequencies generated at the coin box station incident to the deposit of coins thereat and to transmit such information to the coin register and adding circuit of Fig. 8;

Fig. 12 shows schematically a common charge-rate translator link circuit by which all connections are first set up through the common link and thereafter are maintained independent of the common link by individual links such as L and L1 of Fig. 6 which are served by a common group of coin control circuits;

Fig. 13 shows diagrammatically a gradual rate change circuit which permits a change to take place in the charge rates for different telephone calls in such a manner that calls originated prior to the rate change and in progress at the time the rates are changed will have their charges computed at the rates in effect prior to the change;

Fig. 14 shows schematically a timing switch which is capable of serving a trunk having a multiplicity of different initial and overtime time periods applicable thereto. In the illustrated setting of this switch, arc 1 is arranged to identify a call on which the initial and overtime periods are each five minutes in time duration; arc 2 to identify calls having an initial period of five minutes and overtime periods of three minutes each; arc 3 to identify calls having initial and overtime periods of three minutes each; and arc 4 identifies calls having an initial period of three minutes and overtime periods of one minute each. Arc 5 of this switch serves to control its stepping and the terminals of arc 6 connect with various contacts of the coin trunk connector relays such as 1202 of the common link shown in Fig. 12;

Fig. 15 shows a magnetic tape-recorded repeating message circuit common to all trunks which serves to announce to the calling party that an overtime period is about to begin and that the overtime charges will be requested when the calling party disconnects at the end of a connection. In addition, this circuit functions to inform the calling subscriber that a tone signal will be sent thirty seconds before the beginning of each new overtime period;

Figs. 16 and 17 are partial views of a standard telephone coin box modified to embody the coin-controlled signal generators located at the coin box station; and Fig. 18 is a block diagram indicating the manner in which the several figures of the drawings are to be combined to effect a complete diagrammatic disclosure of a telephone system involving the features of this invention.

Referring to the drawings, the apparatus of the originating panel type office X, disclosed schematically in the upper portion of Fig. 1, may be of the well-known type such as is disclosed, for example, in Patent No. 1,862,549 granted June 14, 1932, to R. Raymond and W. J. Scully, and the apparatus of the originating cross bar type office Y, disclosed schematically in the lower portion of Fig. 1 may be of the well-known type such as is disclosed, for example, in Patent No. 2,093,117 granted September 14, 1937, to W. W. Carpenter. The interoffice tandem trunk may be used in common by a panel and a cross bar office if they are in the same building, by strapping both the (*p*) and (*c*) cross-connections, but if such offices are not in the same building it is to be understood that a separate group of tandem trunks would extend from each office to the tandem office, and that a trunk when outgoing from the panel office would be connected by the cross-connections (*p*) to selector bank appearances in such office and when outgoing from the cross bar office would be connected by the cross-connections (*c*) to cross bar switch appearances in such office. The apparatus of the tandem office shown schematically in Fig. 3 may be of the general type disclosed in Patent No. 1,840,132 granted January 5, 1932, to T. H. Roberts, the tandem sender, however, being slightly modified as will be presently described. The interrupters 501, 502 and 503 of Fig. 5 form a part of a motor-driven timer 550 of the general type disclosed in Patent No. 2,112,375 granted March 29, 1938, to E. D. Mead. The interrupters are arranged to be clutched to the shaft of the driving motor by the operation of clutch magnet 504. Interrupters 505 to 511, inclusive, are miscellaneous power-driven interrupters on the interrupter frame of the originating office.

An alternating-current impulse receiving circuit ACR is disclosed in Figs. 10 and 11. This circuit is a substantial duplicate of the circuit shown in Patent No. 2,332,912 granted to G. Hecht, A. A. Lundstrom and E. R. Taylor on October 26, 1943. This receiver circuit will be described in sufficient detail in the present application to insure a clear understanding of its operation. The circuit is, however, described in a more comprehensive manner in the aforenoted Patent No. 2,332,912.

Figure 7:
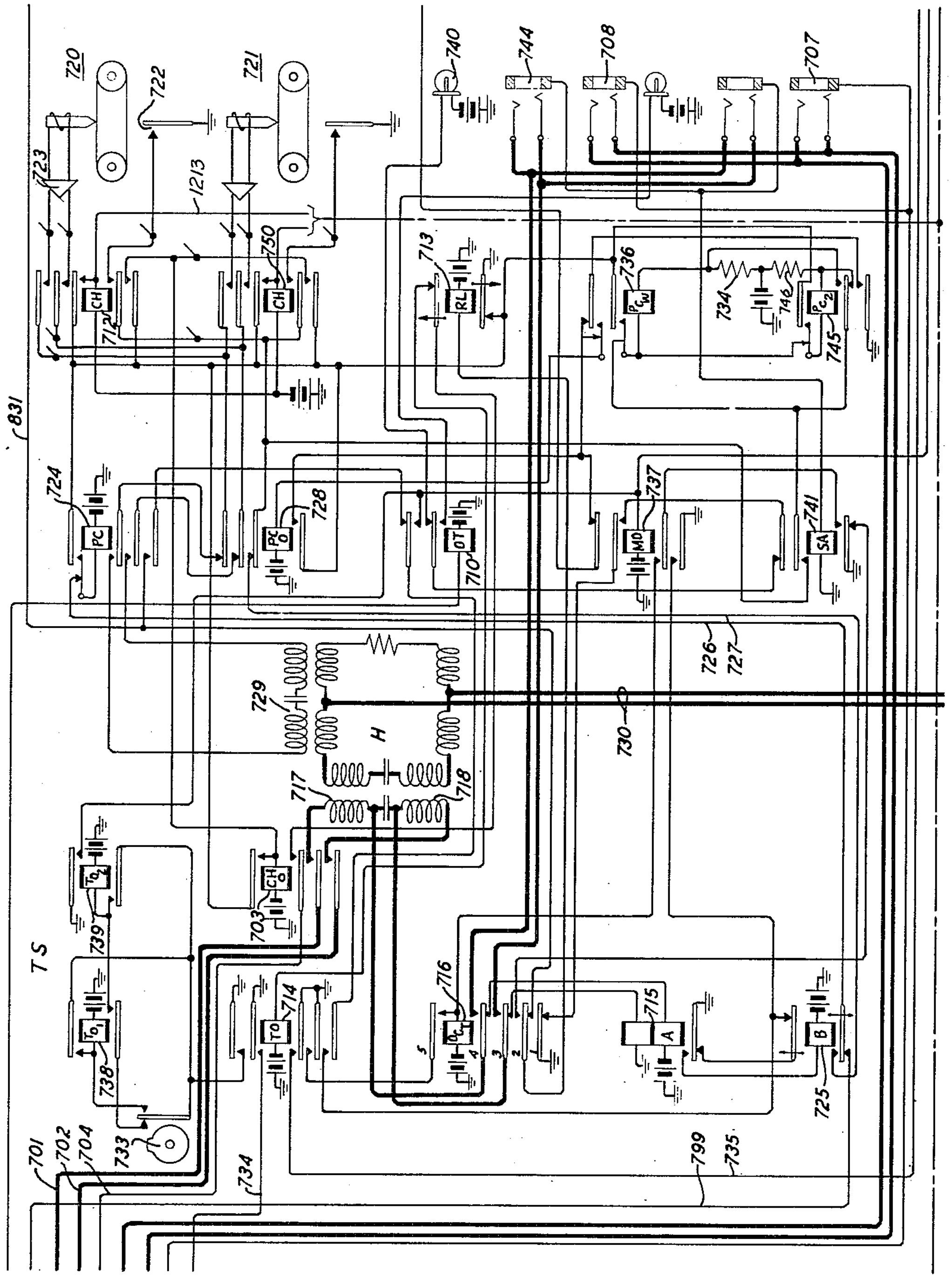
Fig. 7 illustrates diagrammatically the common coin-controlled pronouncement circuit; a timing-out circuit; and a plurality of jacks located at a monitoring operator's position.

The equipment illustrated in Fig. 7 is located at the originating office. It consists principally of a plurality of magnetic tape-type telegraphones, two of which are illustrated diagrammatically at 720 and 721; a timing-out circuit TS, a hybrid coil H, and a plurality of jack terminations. The purpose and functioning of this apparatus will appear from the detailed description to follow. Suffice it to say at this time, that the operation of the equipmetn shown in Fig. 7 is initiated when any one of a group of relays, such as relay 712 is operated incident to the seizure of the tandem trunk by way of a corresponding set of bank terminals 107, 108 or when a called party disconnects at the end of a connection. There are as many relays 712, 750, etc., as there are terminal appearances of the tandem trunk at the originating office and as there are tariffs which may be assessed a calling subscribed for overtime service. For each relay 712, 750, etc., there is one telegraphone such as 720, 721, etc. The telegraphone for each bank appearance carries a pronouncement which indicates the tariff rate prescribed for initial and overtime periods of conversation for a call originated at a coin box station and extended over the corresponding bank appearance of the tandem trunk. Also, the telegraphones carry pronouncements indicative of total overtime charges. Through the medium of the hybrid coil H the pronouncement carried by the telegraphone selectively seized, incident to the initiation of a call at a coin box station, is transmitted to the calling station and, under particular circumstances which will be fully described hereinafter, to the monitoring operator's position. The initial and overtime periods in the present system, may be served by different pronouncement devices since the tariff rates in each case may be different. The request pronouncement may be given any suitable wording, for example, it may consist of the phrase "please deposit ten cents."

The link circuit illustrated in Fig. 6 is common to a plurality of tandem trunks and functions incident to the operation of a trunk preference relay, such as relay 624 and the resulting operation of a corresponding trunk connector relay 626 and a coin control connector relay, such as relay 630, to extend the trunk to the pronouncement circuit, Fig. 7.

The coin register and adding circuit of Fig. 8, as illustrated, comprises three groups of register relays such as CI1, R51, R101, R251 and AI1, CI2, R52, R102, R252 and AI2, and CI3, R53, R103, R253 and AI3. The operation of a relay CI1, CI2 or CI3 determines which of the three registers is to function to register the first deposit of a coin and the circuit is so arranged that relay CI1 will operate to render the first register available to register the first coin deposited, relay CI2 will operate to render the second register available to register the second coin deposited, etc. The relays R51, R52 and R53 operate to recognize the deposit of nickels; relays R101, R102 and R103 to recognize the deposit of dimes; and relays R251, R252 and R253 to recognize the deposit of quarters. Relays AI1, AI2 and AI3 serve to transmit the information registered by the coin register and adding circuit to the totalizing selectors T and AIS of Fig. 9. Relays 820 and 821 which appear at the upper right of Fig. 8 function to control the advance of the initiated call to its desired destination, or to a monitoring operator as conditions require.

The coin signals are generated at the coin box station through the medium of three sets of vibratable reeds located in such positions relative to the slots into which the various coins are deposited in the coin box that each coin, in its passage through its respective slot, contacts a pair of reeds causing them to vibrate. Each pair of reeds, when actuated by a coin deposited by a calling subscriber, vibrates within a coil such as the coils diagrammatically illustrated at the left of Fig. 1. Each coil and its associated pair of reeds are supported within a suitable housing and the housings are mounted on a bracket in the coin box structure. As illustrated, the three generating coils are connected in series across the coin box line and, during the course of a connection involving the coin box line, are energized by current from the central office battery. Each pair of reeds has one reed tuned to vibrate at a frequency *f* and the remaining reed of each set is tuned to vibrate at a different frequency *a*, *b* or *d*. Thus, whenever a coin is deposited in the coin chute the corresponding reeds are vibrated to generate a double frequency current, one of the frequencies in each case being the frequency *f*.

In the instant application, the reed sets are designed so that the pair of reeds associated with the nickel chute will, when vibrated, generate frequencies *a*, *f*; the pair of reeds associated with the dime chute will, when vibrated, generate frequencies *b*, *f*; and the pair of reeds associated with the quarter chute will, when vibrated, generate frequencies *d*, *f*. These frequencies, as will appear from a later description, serve to selectively operate, through the alternating-current signal receiver ACR, Figs. 10 and 11, relays 1100, 1101 and 1102 which control the operation of the so-called nickel, dime and quarter relays of the coin register and adding circuit, Fig. 8.

The selector switches AIS and T of Fig. 9 which function to totalize and check the value of the coins deposited at a coin box station are of the well-known rotary selector switch type, each having its own stepping magnet. The switch AIS is provided with five terminal banks or arcs AIS1, AIS2, AIS3, AIS4 and AIS5 whereas the switch T is provided with four arcs T1, T2, T3 and T4.

The arc T3 of switch T is provided with a plurality of terminals to each one of which, except the first, is permanently connected a charge lead, or conductor, so that each such terminal corresponds to a particular tariff rate, the second terminal being allocated to a five-cent charge, the third to a ten-cent charge, the fourth to a fifteen-cent charge, and so on. Upon the initiation of a toll call at a coin box station a charge lead, such as 1213 for example, is marked so as to mark a corresponding terminal of the arc T3 of switch T and to thereby inform the switches that an amount corresponding to the charge allocated to the particular marked terminal must be deposited by the calling subscriber.

The terminals of arc T1 of switch T are strapped to corresponding terminals of arc AIS1 of the switch AIS whereas the terminals of arc T2 of switch T are strapped to the terminals of arcs AIS2, AIS3 and AIS4 as illustrated. The brushes of arcs AIS2, AIS3 and AIS4 are cut through to the contacts of the so-called nickel, dime and quarter relays, such as R51, R101 and R251, for example, whenever a relay AI1, AI2 or AI3 is operated; so that, if any of the said nickel, dime and quarter relays is operated, the first terminal of the corresponding arc of switch AIS is marked and such marking determines the number of steps to be taken by the selector switch T. It will be observed that the first terminal of arc AIS2, which is rendered operative when a so-called nickel relay, such as R51 for example, is operated, is connected to the first (off-normal) terminal of the arc T2 of switch T; that the first terminal of arc AIS3 of switch AIS corresponding to a so-called dime relay, such as R101 for example, is strapped to the second (off-normal) terminal of the arc T2 of switch T; and that the first terminal of arc AIS4 of switch AIS is strapped to the fifth (off-normal) terminal of arc T2 of switch T. Obviously, therefore, when the selector T is stepped around in search of a marked terminal on its arc T2, it will advance one step if the arc AIS2 of switch AIS is marked to indicate the deposit of a nickel; will advance two steps if the arc AIS3 of switch AIS is marked to indicate the deposit of a dime; and will advance five steps if the arc AIS4 of switch AIS is marked to indicate the deposit of a quarter. Thus, the selector T will advance one, two or five steps depending upon whether the first, second or fifth terminal of its arc T2 is marked through the terminals of arcs AIS2, AIS3 or AIS4, respectively, of switch AIS, which terminals, in turn, are marked as a consequence of the operation of relay R51, R101 or R251, respectively, which occurs when a nickel, dime or quarter, respectively, is deposited at the coin box station. If the correct sum has been deposited by the calling subscriber, the switches AIS and T will operate in such a manner that the brush of arc T3 of switch T will come to rest upon the terminal thereof marked by a charge lead, such as conductor 1213 for example, and the initiated call will be allowed to advance. If the brush of arc T comes to rest upon an unmarked terminal indicating a deposit of an incorrect amount of tariff by the calling subscriber the connection will be directed to a monitoring operator as will be described more fully hereinafter.

It will be observed also that the terminal strappings between arc T2 of switch T and of arcs AIS2, AIS3 and AIS4 of switch AIS are so arranged that it makes no difference what coins are used in payment for the toll charge so long as their total value corresponds to the tariff rate prescribed. For example, a toll charge of twenty-five cents may be paid with five nickels, with one nickel and two dimes, or with three nickels and one dime, and the switches AIS and T will function to check the total deposit against the prescribed tariff rate.

Arc T4 of switch T and arc AIS5 of switch AIS function to restore their respective switches to normal, and to thereafter transmit the signal which permits the initiated call to be advanced to completion, or the signal which routes the call to a monitoring operator.

It is understood also that the switches AIS and T function similarly to total the coins deposited by a calling subscriber for total overtime charges, which deposit is made at the termination of a connection between calling and called subscribers and in response to the connection of a tariff pronouncement device to the calling line incident to the disconnection by the called subscriber.

*Initiation of call into ten-cent toll area*

It will be assumed that a person at the substation 100 of the coin box line (Fig. 1) which terminates in the panel type office X, desiring a toll connection, deposits a nickel in the nickel coin slot of the coin box apparatus schematically shown at 101 in Fig. 1, and upon removing the substation receiver from the switchhook becomes connected by the line finder 102, over the line finder district selector trunk 103 and the usual sender link circuit (not shown), with an idle sender 104 in the manner fully described in Patent No. 1,862,549, hereinbefore referred to. When the calling line becomes connected with the sender the usual dial tone is transmitted from the sender to appraise the calling person that he may proceed to dial the digits of the telephone number of the desired line. It will be assumed further that a number is dialed, the office code digits of which indicate that a ten-cent charge is required for the initial period of conversation. In accordance with the present invention all toll calls to be terminated in the nearly toll area, such, for example, as calls involving ten cents, fifteen cents, etc. initial charges are routed over special tandem trunks to a tandem office through which they are then completed. Therefore, in response to the registration of the office code digits indicative of the fact that the call is to be extended into a ten-cent zone of the exchange area, the sender 104 proceeds to control the setting of the district selector 105 and the office selector 106 to select an idle trunk extending to the tandem office. It will be assumed that the trunk disclosed in Figs. 1, 2, 3, 4 and 5, is idle and is seized therefore by the office selector over the bank terminal set 107.

It will be noted that this trunk has two terminal bank appearances in the switch bank of office selector 106, one of which, 107, is allocated for seizure on all toll calls for which the initial charge rate is ten cents and the other of which, 108, is allocated for seizure on all toll calls for which the initial charge rate is fifteen cents. It is obvious that if it should be desirable to enable connections to be established by dial control from coin box lines to subscribers' lines terminating in more remote offices of the exchange area, other appearances of the tandem trunk in banks of selector switches may be provided, allocated, for example, to calls for which the initial charge rate might be twenty cents, twenty-five cents, etc.

When the tandem trunk is seized, ground is applied over the sleeve brush 109 and sleeve terminal 110 of the trunk in well-known manner and thence to the sleeve terminal of all other bank appearances of the trunk and multiples thereof to mark the trunk busy. When all digits dialed have been registered in the sender 104, a circuit is established from battery through the right winding of relay 300 and over contacts of cam 301 in the incoming end of the tandem trunk of the tandem office, over trunk conductor 302, the No. 8 back contacts of relay 200, the No. 5 back contacts of relay 201, through the upper winding of polarized relay 202, the No. 7 back contacts of relay 203, the No. 8 back contacts of relay 204, conductor 205, inner upper back contacts of relay 1501, conductor 1502, upper winding of relay 111, outer upper back contacts of relay 112, over the tip bank terminal of terminal set 107, tip brushes of selectors 106 and 105, contacts of cam 113 at the district selector 103, thence through the windings of relays in the sender 104, returning over contacts of cam 114, ring brushes and corresponding terminals of selectors 105 and 106 including the ring terminal of terminal set 107, inner lower back contacts of relay 112, conductor 1503, outer upper back contacts of relay 1501, conductor 206, the No. 2 back contacts of relay 204, the No. 1 back contacts of relay 203, through the lower winding of polarized relay 202, the No. 3 back contacts of relay 201, the No. 2 back contacts of relay 200, trunk conductor 303, contacts of cam 304 to ground through the left winding of relay 300. Relays 111 and 300 operate in this circuit, relay 300 functioning to cause the association of a tandem sender with the incoming end of the tandem trunk, and relay 111, upon operating, establishing a locking circuit for itself extending from battery through the winding of relay 115, through the lower winding and contacts of relay 111, conductor 116, the No. 5 normal contacts of relay 203, conductor 117, sleeve terminal 110, brush 109 to ground in the office selector.

Relay 115 operates in this locking circuit, locks over its upper front contacts to ground on conductor 116; connects the trunk conductors 205 and 206 and the corresponding condutcors 1502 and 1503 over its inner upper and lower front contacts to the tip and ring terminals of tht terminal set 107 independently of the contacts of relay 112; and establishes a circuit for relay 112 which may be traced from grounded battery through its winding, over the auxiliary inner front contacts of relay 115 to ground. Relay 112 upon operating, at its lower back contacts disconnects the multiples of all unused appearances of the trunk. These operations take place while the circuits at the tandem office are recognizing the closure, advancing the trunk and link circuits and selecting an idle sender.

Figure 3:
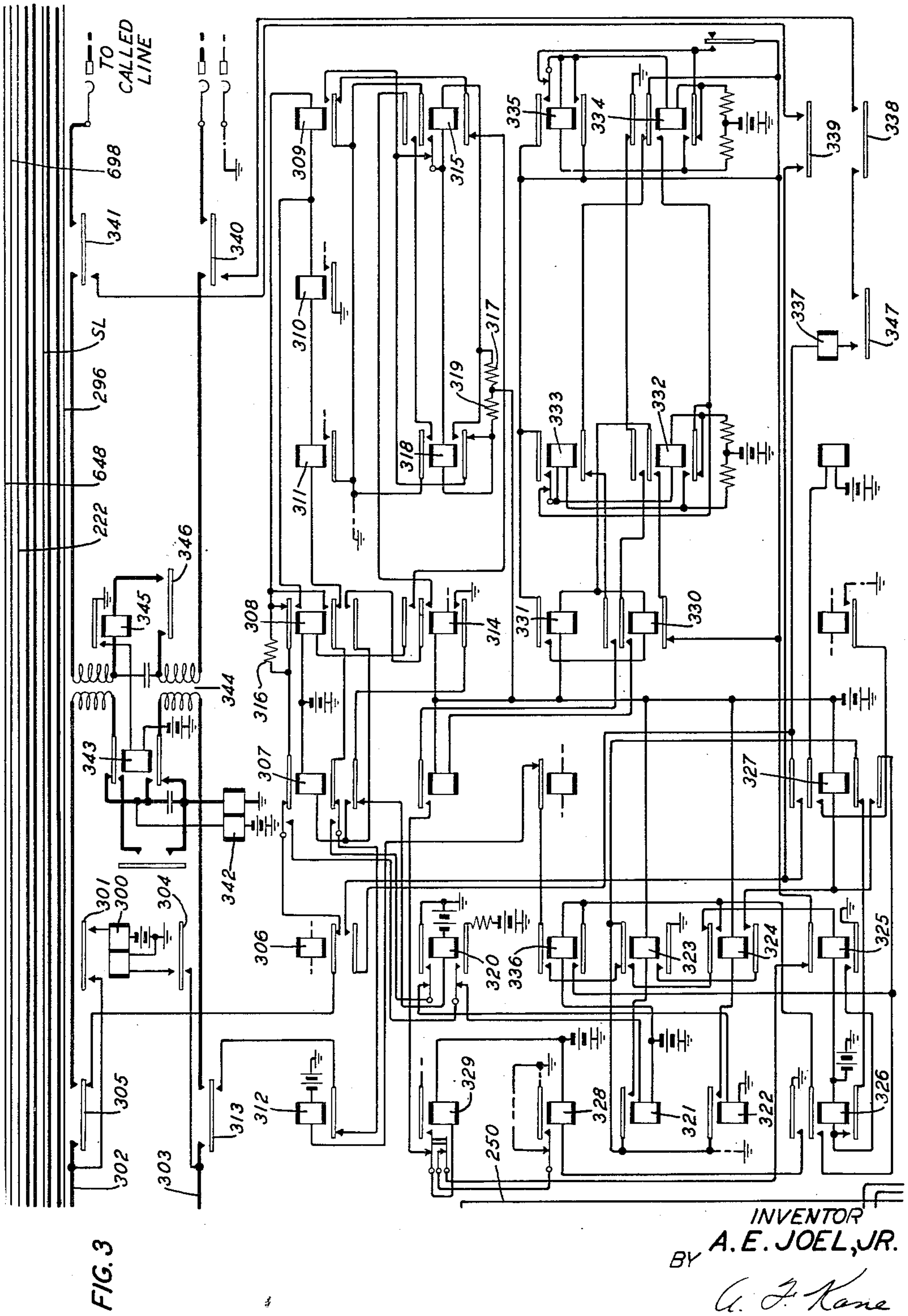
Fig. 3 shows, in the upper portion thereof, the tandem office end of the tandem trunk terminating in a tandem district selector, and, in the lower portion thereof, such portions of a tandem sender associable with the trunk as are necessary to an understanding of the invention.
Figure 4:
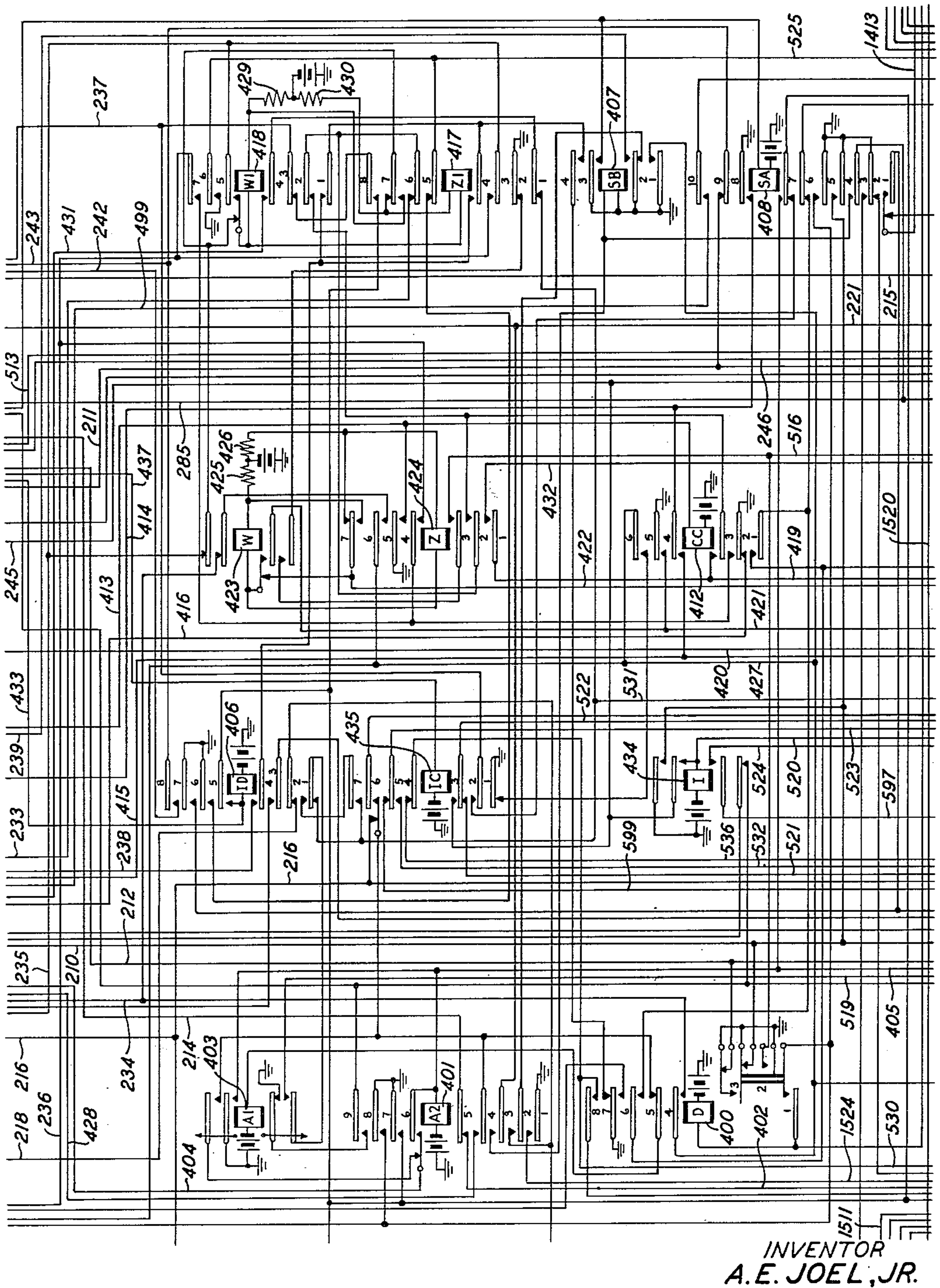

Upon seizure of the tandem sender, a pulse receiving circuit is established between the original sender and the tandem sender, schematically disclosed in the lower portion of Fig. 3, which extends, as previously traced, from the sender 104 to trunk conductor 302, thence over contacts of cam 305, back contacts of relay 306, upper normal contacts of relay 307, upper back contacts of relay 308, serially through the windings of impulse responsive relays 309, 310 and 311, lower back contacts of relay 308, inner lower normal contacts of relay 307, contacts of relay 312, contacts of cam 313, trunk conductor 303 and thence as traced to the originating sender 104. In response to the closure of this circuit the originating sender proceeds to transmit codes of impulses for the purpose of transferring the called line designation digits from its registers to registers of the tandem sender. At the end of the last code impulse transmitted for the units digit series, with relay 314 operated, relay 308 operates in a circuit from battery through its winding, over the outer upper contacts of relay 314, lower back contacts of relay 315, the back contacts of relay 309 to ground. With relay 308 operated, the impulse receiving circuit is prepared for the reception of the final positive impulse transmitted from the sender 104 which circuit extends, as previously traced, over the upper normal contacts of relay 307, thence over the upper front contacts of relay 308, through the windings of the negatively polarized impulse responsive relay 309, over the inner lower front contacts of relay 308 and thence, as previously traced, to the originating sender. Relay 308, at its upper back contacts removes the shunt from resistance 316 and bridges this resistance across the impulse receiving circuit in parallel with the winding of relay 309. The winding of relay 309 is now connected reversely into the impulse receiving circuit whereby it is responsive to the receipt of the final heavy positive impulse and establishes a circuit from ground over its front contacts, over the upper normal contacts of relay 315, through the winding of relay 315 and resistance 317 to battery. Relay 315 upon operating locks over its inner upper alternate contacts to ground and prepares a circuit for relay 318. Upon the termination of the final heavy positive impulse when relay 309 releases, relay 318 energizes in a circuit from battery through resistance 319, the winding of relay 318, the inner alternate contacts of relay 315 to ground. With relays 315 and 318 now both operated, a circuit is established for transfer relay 307 extending from grounded battery through its winding, over the outer lower front contacts of relay 308, the inner upper front contacts of relay 314, the upper front contacts of relays 315 and 318 to ground. With relay 307 operated, the circuit previously established by the operation of relay 314 for relay 320 is opened at the lower back contacts of relay 307; relay 307 is locked over its lower front contacts to ground at the lower front contacts of relay 314; and the circuit extending back to the originating sender is transferred from the winding of relay 309 to the windings of relays 321 and 322, trunk conductor 302 being now extended over the contacts of cam 305, the back contacts of relay 306, the upper alternate contacts of relay 307, over the lower normal contacts of relay 320, to battery through the winding of relay 321, and trunk conductor 303 being now extended over contacts of cam 313, the back contacts of relay 312, the inner lower alternate contacts of relay 307, the upper normal contacts of relay 320, to ground through the winding of relay 322.

At the outgoing end of the tandem trunk, polarized relay 202 operated its armature against its left contact in response to the final heavy positive impulse, in turn causing the operation of relay 207 in a circuit from battery through its winding and the left contacts of relay 202, conductor 208, to ground at lower front contacts of relay 112. Relay 207 upon operating locks in a circuit from battery through its winding, over its upper front contacts and the No. 1 back contacts of relay 200 to ground on conductor 208. At the end of the heavy positive impulse polarized relay 202 operates its armature against its right contact thereby opening the operating circuit of relay 207 and, with relay 207 locked operated, establishes a circuit from battery through the winding of relay 203, over the inner lower front contacts of relay 207 and the right contacts of relay 202 to ground on conductor 208. Relay 207 also connects ground on the No. 2 back contacts of relay 203 and its lower front contacts to peg count register conductor 209, and at its back contacts opens the timed release circuit. Relay 203, upon operating, locks over its No. 4 contacts to ground on conductor 208; opens the peg count register circuit at its No. 2 back contacts; at its No. 5 alternate contacts establishes a new holding circuit for relay 115 extending from conductor 116 over such contacts and conductor 210 to ground over the No. 3 back contact of relay 400; establishes an operating circuit for relay 201 extending from battery through its winding, over the No. 6 contacts of relay 203, the No. 7 contacts of relay 200, conductor 211, the inner upper back contact of relay 500, conductor 212 to ground over the inner lower normal contacts of relay 400; connects ground over its No. 2 front contacts and conductor 117 to the sleeve terminals of the trunk office selectors of the panel office; connects ground over its No. 3 contacts and conductor 118 to sleeve terminals of the trunk in the office switches of the cross bar office in cases where the trunk is allocated to a cross bar office; at its Nos. 1 and 7 back contacts opens the circuit previously traced through the windings of polarized relay 202; extends the trunk conductor 205 over the No. 8 back contacts of relay 204, the No. 7 front contacts of relay 203, the No. 6 back contacts of relay 204, to ground through the lower winding of relay 213; and extends trunk conductor 206 over the No. 2 back contacts of relay 204, the No. 1 front contacts of relay 203, and the No. 1 back contacts of relay 204 to battery through the upper winding of relay 213. Relay 201, upon operating, disconnects the windings of polarized relay 202 from the trunk conductors 302 and 303 at its Nos. 3 and 5 back contacts; bridges, at its No. 6 contacts, the contacts of relay 500 included in its operating circuit; at its No. 5 front contacts connects ground over the No. 8 back contacts of relay 200 and thence over the circuit traced to battery through the winding of relay 321 at the tandem sender, thereby causing the operation of relay 321 followed by the operation of relay 323; and connects ground over its No. 4 contacts, conductor 214, the No. 5 back contacts of relay 401, conductor 402, to the armature of interrupter 507, which upon making its left contact completes the circuit of relay 512 over conductor 513, the No. 3 back contacts of relay 200, conductor 215 to battery through the winding of relay 512. Relay 512 operates in this circuit to start a timing cycle to be later described.

The operation of relay 323 at the tandem sender signals the sender that timing thereat must be suspended since there will be some delay before the calling subscriber is advised of the amount of toll to be deposited in the coin box and until the amount deposited is checked automatically. Relay 323 closes a circuit from ground over its upper front contacts and the upper back contacts of relay 324 through the winding of relay 325 to battery. Relay 325 operating in this circuit, causes the operation of relay 326 over an obvious circuit, which relay locks under the control of relay 327 over its lower front contacts and the back contacts of relay 327, and at its upper front contacts closes an obvious operating circuit for relay 328. With relay 328 operated, or unoperated, ground is connected over its contacts, the lower normal contacts of relay 329 and the back contacts of relay 325 to the back contacts of timing relay 330 to start the operation of timing relays 330 to 335 to time out the tandem sender, but since relay 325 has been operated, this timing start circuit is not effective and the timing out of the sender is therefore delayed.

When the originating sender has completed the transmission of the final heavy positive impulse, it advances the sequence switch of the district selector 105 into the trunk closure position and the originating sender then becomes disconnected from the line finder district selector trunk 103 and is restored to normal. Relay 213 now operates in a circuit which may be traced from battery through its upper winding, the No. 1 back contacts of relay 204, the No. 1 front contacts of relay 203, the No. 2 back contacts of relay 204, conductor 206, the outer upper back contacts of relay 1501, conductor 1503, the middle lower front contacts of relay 115, ring terminals and brushes of selectors 106 and 105, contacts of cams 114 and 119, ring brush and terminal of the line finder 102, thence over the calling line loop, over the tip terminal and brush of the line finder 102, contacts of cams 120 and 113, tip brushes and terminals of selectors 105 and 106, middle upper front contacts of relay 115, conductor 1502, inner upper back contacts of relay 1501, conductor 205, the No. 8 back contacts of relay 204, the No. 7 front contacts of relay 203, the No. 6 back contacts of relay 204, to ground through the lower winding of relay 213. Relay 213, upon operating over this circuit establishes a circuit from ground over its lower contacts, conductor 216, the normal No. 6 contacts of relay 435, the No. 5 contacts of relay 400 to battery through the winding of slow-to-release relay 403, and at its upper contacts prepares the circuit for relay 217. Relay 403, upon operating, locks in a circuit extending from battery through its winding, over the No. 5 back contacts of relay 400, the outer upper front contacts of relay 403, the No. 6 normal contacts of relay 401, conductor 404, to ground at the No. 7 back contacts of relay 204 and, at its inner upper front contacts connects ground to conductor 405 and through the winding of relay 401 to battery. Relay 401 now operates, locking over its No. 6 alternate contacts and conductor 404 to ground at the No. 7 back contacts of relay 204; opens, at its No. 6 normal contacts, the locking circuit for relay 403 just traced; completes the operating circuit of relay 217 which may be traced from battery through its winding, over the upper contacts of relay 213, conductor 218, the No. 2 back contacts of relay 406, the No. 2 front contacts of relay 401, to ground at the lower back contacts of relay 407; opens at its No. 5 back contacts the previously traced circuit for relay 512 which relay thereupon releases, and at its No. 3 contacts connects the sleeve lead SL over the No. 1 contacts of relay 201, conductor 221, the No. 3 contacts of relay 401 to ground through the winding of relay 407.

*Seizure of request pronouncement circuit*

The outgoing tandem trunks are arranged in groups of eight or ten trunks, each of which can reach the plurality of coin control circuits in an office through an individual link. Two such links are shown in Fig. 6. In addition, there is a common link such as shown in Fig. 12, for all outgoing tandem trunk circuits which is momentarily used on each seizure of a coin control circuit.

Incident to the operation of relay 401, relay 217 operates and completes an operating circuit for trunk preference relay 624 which extends from grounded battery, over the inner front contacts of relay 217, conductor 222, winding of relay 624, to ground by way of the lower normally closed contacts of relay 625.

With trunk preference relay 624 operated, trunk connector relay 626 operates in a circuit extending from grounded battery, through the winding of relay 626, inner upper front contacts of preference relay 624, back contact and upper armature of relay 627, conductor 628, armature and front contact of normally opearted relay 1201. At its upper armature and front contact, relay 624 extends the ground at the armature and front contacts of relay 1201 to conductor 629 and thence through the winding of trunk connector relay 1202 to grounded battery. Relay 1202 is located in the common link and is associated with the seized trunk.

When relay 217 operated, as described, ground by way of its lower armature and front contact is extended to conductor 250 and thence to the lower armature of relay 1401 which relay is operated in a circuit extending from grounded battery, through its winding, conductor 1402 to ground by way of the front contact and outer lower armature of relay 115. With relay 1401 operated, ground is extended by way of rate conductor 1403 to armature *a* of relay 1202.

The same ground from the lower armature contact of relay 217 passes through arc 6 of timing control switch TM to indicate the amount of time that has elapsed on the originated call. This ground is applied to the brush of arc 6 of switch TM over conductor 250. Since this switch is in normal position when the circuit is first seized, the first terminal 1 which now has ground potential on it indicates that the originated call is in its initial time period, the charge for which does not start until the called party answers. Thus the grounding of conductor 1404 associated with the first terminal of arc 6 of switch TM indicates the length of time the call is being charged for and the grounding of conductor 1403, as hereinbefore described, indicates the rate at which the call is to be charged.

Before following the immediate results of the grounding of rate conductor 1403 and time conductor 1404, brief reference is made to the "gradual rate change" circuit shown in Fig. 13. Assuming all relays of Fig. 13 are in their normal illustrated conditions, "high rate" relay 1205 will be operated over an obvious circuit including the grounded outer lower armature contacts of relay 1301, and "low rate" relay 1206 will be released since its operating circuit is open at the outer lower armature contacts of relay 1302. Ground on rate lead 1403 is now extended over armature *a* of relay 1202 and its front contact, conductor 1204, armature No. 4 and front contact of relay 1205, armature No. 4 and back contact of relay 1206, to battery and ground by way of the winding of relay 1303. Relay 1303 operates in this circuit. Ground on the time lead 1404 is now extended to armature *b* of relay 1202 and its front contact, over conductor 1226, inner upper armature and front contact of relay 1303, upper armature and back contact of relay 1304, through the winding of relay 1301 to battery and ground. Relay 1301 operates in this circuit. Relay 1301, operated, releases relay 1205 which, in turn, releases relay 1303 thereby permitting the ground on the rate lead 1403 to be extended over armature *a* of relay 1202, conductor 1204, armature No. 4 and back contact of relay 1205, winding of "charge rate translator" relay 1203 to battery and ground.

Relay 1203 at its armature *a* and front contact completes an operating circuit for relay 1207 which includes the lower armature and back contact of either relay 1208 or relay 1209 so that if either of these relays is released relay 1207 will operate. Assuming relay 1209 is released, relay 1210 will also operate incident to the operation of relay 1203 in a circuit which includes the upper armature and back contact of relay 1209.

Relay 1211 of an idle coin control circuit now operates in a circuit extending from grounded battery, through the winding of relay 1211, front contact and upper armature of relay 1210, back contact and lower armature of relay 1209, to ground by way of the front contact and armature *a* of relay 1203.

Relay 1211 in operating cuts through the charge leads and leads grounded by the operated relay 1202 to indicate the particular link associated with the trunk circuit.

Relay 630 now operates in a circuit which extends from grounded battery, over conductor 631, through the winding of relay 630, conductor 632, armature *a* of relay 1211, conductor 1212, armature *c* of relay 1202 and its front contact to ground. Relay 630, at its armature *c* and front contact completes an obvious locking circuit for relay 626.

With relays 217, 1202, 1203 and 1211 operated and timing switch TM in its first position, ground at the outer lower armature and front contact of relay 217 is connected to conductor 1213 causing relay 712 to operate. The path for this connection may be traced from ground, over the outer armature and front contact of relay 217, conductor 250, brush of arc 6 of switch TM, conductor 1404, contacts and armatures *b* of relays 1202, 1203 and 1211, conductor 1213 to grounded battery through the winding of relay 712.

With relays 626 and 630 operated, as described, the link L is interposed between the coin controlled pronouncement circuit (Fig. 7) and the leads extending from the trunk.

The ground on conductor 1213, referred to hereinbefore, is extended also to contact 901 of the arc T3 of selector switch T (Fig. 9), which switch also includes the terminal arcs T1, T2 and T4. Thus, in response to the seizure of the tandem trunk by way of the terminal appearance 107, which is allocated to a call whose initial toll charge is ten cents, the terminal 901 of arc T3 of the switch T is marked with ground potential from relay 217.

It will be observed that each of the armatures 4 to 22 of trunk connector relays, such as relay 1202, correspond to individual terminals of arc 6 of switch TM and when operated, connect their corresponding switch terminals to front contacts of the rate relays such as relay 1203, the corresponding armatures of which are connected to "charge" terminals to which the front contacts of the coin control connector relays such as 1211 are permanently connected. In the drawing (Fig. 12) these latter terminals are identified with the small numerals 5, 10, 15 . . . 110 to indicate that each such terminal represents a charge conductor corresponding to a particular tariff rate such as five cents, ten cents, fifteen cents, etc. Incident to the operation of a relay such as 1211, these charge terminals are extended to the charge conductors such as 1213 so that, in the present case, the charge conductor 1213, because of the operation of relay 1211 is connected to the terminal identifying the tariff rate ten cents.

In the case under description and as indicated by the strapping of the armatures controlled by the rate relay, such as relay 1203 the calls served by such relay are assigned an initial period of five minutes and overtime periods also of five minutes and the charge for the initial period is ten cents and is thirty cents for any portion of succeeding five-minute overtime periods. To illustrate further, it will be noted that the calls served by rate relay 1215 are assigned an initial period of five minutes and overtime periods of three minutes; also the charge for the initial period is ten cents and fifteen cents for the overtime periods.

It will be observed further that relays such as 1203 and 1215 are controlled by the "high rate" relay 1205 and that such relays as 1220 and 1221 will operate only when both the "high rate" relay 1205 and the "low rate" relay 1206 are operated. It will be observed also that when a rate relay such as 1220 or 1221 operates, lower charge rates prevail than when a rate relay such as 1203 or 1215 is operated. This is apparent from the charge numerals associated with the armatures of the rate relays. In the description herein made the respective rates for initial and overtime periods are selected merely for descriptive purposes and do not necessarily represent charges which prevail in actual practice.

The leads 640 and 641 of link L extend the trunk leads 297 and 298 from the Nos. 7 and 2 armatures of relay 229 to corresponding conductors 701 and 702 which terminate at the middle and outermost lower armatures of relay 703.

The link lead 642 extends the sleeve conductor SL which, as before described, is extended to the winding of relay 407 by way of the No. 1 contacts of relay 201, conductor 221, and the No. 3 contacts of relay 401, to the corresponding lead 704.

The link leads 643 and 644 extend the trunk leads 294 and 295 from upper and lower front contacts of relay 247 to the tip and ring terminals of jacks 707 and 708 in multiple at a monitoring operator's position. The link lead 645 connects the sleeves of jacks 707 and 708 to the lead 296 which is connected to the Nos. 2 and 4 armatures of relays 247 and 229, respectively.

The link lead 646 extends the operating winding of relay 710 to the conductor 648 which terminates at the inner upper front contact of overtime relay 1526. The link lead 647 provides locking ground for the operated trunk connector relay 626, as hereinbefore indicated.

The link lead 699 extends conductor 799 to conductor 698 which terminates at the outer upper front contact of relay 1534.

*Initial response of request pronouncement circuit*

It will be observed that the ground which is connected to the charge lead 1213 by virtue of the operation of relay 115 and the subsequent operation of relay 217 and extended to the terminal 901 of arc T3 of the switch T, is also extended to battery through the winding of relay 712. Relay 712 accordingly operates in this circuit and locks under control of slow-to-release relay 713. At its outer lower armature and front contact relay 712 completes an operating circuit for relay 703 which may be traced from grounded battery, through the winding of relay 703, outer lower armature and front contact of relay 712, to ground by way of the back contact and lower armature of relay 713.

It will be understood that relay 712 corresponds to charge conductor 1213 and therefore identifies the charge rate of ten cents. Similarly, the telegraphone 720 which is identified with relay 712 bears the request pronouncement corresponding to the ten cents rate as will be described more fully hereinafter.

Relay 703, at its middle and outermost lower armatures, extends the trunk conductors 701 and 702 to the output side of hybrid coil H. At its innermost lower armature and front contacts, relay 703 completes the following circuit: from grounded battery, winding of relay 714, upper back contacts and armature of relay 713, front contact and innermost lower armature of relay 703, conductor 704, corresponding front contacts of relay 630, link conductor 642 and corresponding front contacts of relay 626, conductor SL, No. 1 contacts of relay 201, conductor 221, No. 3 contacts of relay 401, to ground through the winding of relay 407.

Relays 714 and 407 operate in this circuit. At its inner upper front contact relay 714 applies ground to conductor 734 which serves to lock relay 630 by way of its armatures *a* and *b* and their associated front contacts. This ground also causes relay 627 to operate in an obvious circuit which includes armature *b* of relay 630 and its front contact. Relay 630, operated, operates relay 1209 of all other coin supervisory links to preclude the possibility of the same coin supervisory circuit from being connected to a trunk through one of the other links.

Relay 627, operated, locks under control of relay 1207 and at its upper armature starts the process for releasing the trunk preference relay 624 of the link L. However, relay 624 does not release until relay 217 of the trunk circuit is released after the aforementioned operation of relay 407. Relays 626 and 630 remain locked under control of relay 714. Relay 627, as previously described, locks under control of relay 1207 and prevents new calls from being served by a link which has already served a call until calls waiting in other links are served.

Relay 407 upon operating establishes, at its No. 3 contacts, an obvious operating circuit for relay 408. Relay 407, at its No. 2 contacts, opens the original energizing circuit for relay 217. Relay 217 releases and removes ground from conductor 250 which, as hereinbefore described, is extended, by way of time switch TM (arc 6), conductor 1404, through the cross-connections effected by relays 1202, 1203 and 1211 to terminal 901 of arc T3 of the switch T.

Relay 228 now operates in a circuit which may be traced from grounded battery, through the lower winding of relay 715, No. 4 armature contacts of relay 716, winding 717 of hybrid coil H, front contact and middle lower armature of relay 703, conductor 701, armature *h* and front contact of relay 630, link lead 640, front contact and armature *g* of relay 626, conductor 297, No. 7 back contacts of relay 229, conductor 499, winding of relay 228, No. 2 back contacts of relay 229, conductor 298, armature *f* and front contact of relay 626, link lead 641, front contact and armature *g* of relay 630, conductor 702, outermost lower armature and front contact of relay 703, winding 718 of hybrid coil H, No. 3 back contacts of relay 716, to ground through the upper winding of relay 715. Relay 715 operates with relay 228 in this circuit.

Relay 408 upon operating, incident to the operation of relay 407, as described, connects, at its No. 10 contacts, a double frequency tone source 409 connected to conductor 589 to conductor 499 which, by way of the No. 7 contacts of relay 229 is connected to conductor 297, thence by way of link L to conductor 701 in a manner now apparent, to the hybrid coil H for a purpose which will appear from a later description; connects the winding of relay 407 over its No. 3 contacts and conductor 285 directly to the sleeve lead SL; and establishes a circuit for relay 412 which may be traced from battery, through the winding of relay 412, over conductor 413, the No. 6 contacts of relay 229, contacts of relay 228, conductor 414, to ground over the No. 8 contacts of relay 408.

Relay 412 now operates and locks in a circuit extending from grounded battery through its winding, conductor 413, the No. 6 contacts of relay 229, conductor 415, the No. 4 contacts of relay 412, to ground at the No. 8 contacts of relay 408; at its No. 2 contacts it removes ground from conductor 416 extending to the line discharge network comprising resistances 230 and 231 and condenser 232; at its No. 3 contacts it connects resistances 514 and 515 across the calling line in bridge of the windings of relay 213 in a circuit which may be traced from grounded battery, through the upper winding of relay 213, the No. 1 contacts of relay 204, the No. 3 contacts of relay 229, conductor 233, the No. 6 contacts of relay 417, the No. 2 contacts of relay 418, the No. 3 contacts of relay 412, conductor 419, resistances 514 and 515 in series, conductor 420, the No. 6 contacts of relay 204, to ground through the lower winding of relay 213; and connects ground by way of its No. 5 contacts and conductor 421 to the fixed contact of interrupter 505. As soon thereafter as cam 505 causes the closure of its contacts a circuit is completed from the grounded conductor 421 over conductor 422, the lower normal continuity contacts and winding of counting relay 423, resistance 425 to grounded battery and also from the continuity contacts of relay 423 through the winding of relay 424, resistance 426 to grounded battery.

Relay 423 operates but the winding of relay 424, being shunted by its own No. 7 contacts does not operate as long as the contacts of interrupter 505 are closed. Relay 423, operated, locks over its inner lower alternate contacts to ground over the No. 5 contacts of relay 412. Upon the next opening of the contacts of interrupter 505 the initial operating circuit of relay 423 is opened and relay 424 operates in a circuit extending from grounded battery, through resistance 426, winding of relay 424, over the inner lower alternate contacts of relay 423 to ground over the No. 5 contacts of relay 412. With relay 424 now operated, a shunt is established from conductor 419 over the No. 1 contacts of relay 424 and conductor 432 around resistance 514 thereby reducing the shunt resistance across the calling line to a smaller value. With both relays 423 and 424 operated, the circuit for relay 500 is established from grounded battery, through the winding of relay 500, conductor 516, the No. 3 contacts of relay 424, the outer lower contacts of relay 423 to ground at the No. 2 contacts of relay 417. Relay 500, operated, shunts resistance 515 over its uppermost contacts thereby further reducing the resistance of the shunt across the calling line.

Upon the next closure of the contacts of interrupter 505 ground from conductor 421 is connected over such contacts, conductor 422, the No. 7 contacts of relay 424, to a point between the winding of relay 423 and resistance 425, whereupon the winding of relay 423 becomes shunted and relay 423 releases. The circuit of relay 500 is now open at the outer lower contacts of relay 423 and relay 500 releases. With relay 423 released and relay 424 still operated, a circuit is established from grounded battery through the winding of relay 204, over conductor 234, the inner upper back contacts of relay 423, the No. 6 contacts of relay 424, to ground applied to conductor 427 over the outer lower contacts of relay 407. Relay 204 operates in this circuit.

Relay 204, operated, disconnects the windings of relay 213 from the calling line at its Nos. 1 and 6 back contacts while the line is still short-circuited; establishes a holding circuit for relay 403 extending from grounded battery through the winding of relay 403, over the No. 5 back contacts of relay 400, the No. 4 front contacts of relay 401, conductor 428, to ground by way of the No. 7 front contacts of relay 204; transfers the tip and ring trunk conductors 205 and 206 at its Nos. 2 and 8 contacts from contacts of relay 203 to contacts of relay 229 in preparation for the return of the initially deposited coin at the coin box at the calling station 100; and establishes the operating circuit for counting relay 418 which may be traced from grounded battery, through resistance 429, the winding and No. 5 normal continuity contacts of relay 418, the outer upper back contacts of relay 423, conductor 235, the No. 3 contacts of relay 204, conductor 236, the No. 4 contacts of relay 424, to ground at the No. 2 front contacts of relay 412. The operating circuit for counting relay 417 is also prepared at this time from ground, thence as traced over the No. 5 normal contacts of relay 418, through the winding of relay 417 and resistance 430 to battery, but the winding of relay 417 is shunted at this time over its own No. 7 back contacts as long as relay 424 remains operated and relay 417 therefore does not operate. Relay 418, operated, locks over a circuit from grounded battery through resistance 429, its winding and No. 5 alternate contacts, conductor 235 and thence to ground as traced hereinbefore.

*Return of initially deposited coin*

With relay 418 operated, coin return battery is connected from the source 517, over the No. 9 back contacts of charge relay 518, conductor 519, lower front contacts of relay 403, No. 1 back contacts of relay 406, No. 1 back contacts of relay 417, No. 4 front contacts of relay 418, conductor 431, over the Nos. 1 and 8 back contacts of relay 229 and the Nos. 2 and 8 front contacts of relay 204, thence as traced over the tip and ring conductors of the established connection through the magnet of coin box 101 at station 100, to ground over contacts closed thereat by the deposited coin. The coin box magnet is now energized in such a manner as to deposit the coin in the return chute where it may be recovered by the calling person.

Upon the second opening of the contacts associated with interrupter cam 505, the holding circuit for counting relay 424 extending from ground on conductor 421, over the contacts of interrupter 505, conductor 422, the inner lower normal contacts of relay 423, through the winding of relay 424 and resistance 426 to battery is opened, and relay 424 releases. With relay 424 released, the shunt about the winding of relay 417 is removed and relay 417 operates over a circuit from battery through resistance 430 and its own winding, over the No. 5 alternate contacts of relay 418, conductor 235, the No. 3 contacts of relay 204, conductor 236, the No. 7 contacts of relay 418, to ground at the No. 2 front contacts of relay 412. On the third closure of the contacts of interrupter cam 505 the previously traced circuit for relay 423 is established whereupon the relay reoperates, but relay 424 being shunted over its own No. 7 back contacts does not operate at this time. With relay 417 now operated, the circuit over which coin return current was applied to the coin box 101 at station 100 is opened at the No. 1 back contact of relay 417, and the capacity discharge of the calling line is established over the tip and ring conductors of the calling line extended through the operation of relay 204 to the Nos. 1 and 8 back contacts of relay 229 and thence through resistances 230 and 231 and condenser 232 to ground.

Upon the third opening of the contacts of interrupter 505, the shunt of the winding of counting relay 424 is opened and relay 424 operates over the previously traced circuit. Upon the fourth closure of the contacts of interrupter 505, relay 423 is shunted down in the manner previously described and a shunt of the winding of relay 418 is thereupon established from a point between its winding and resistance 429, over the No. 7 front contacts of relay 417, the upper back contacts of relay 423, conductor 235, the No. 3 contacts of relay 204, conductor 236, the No. 4 contacts of relay 424, to ground at the No. 2 front contacts of relay 412. A circuit is now established from battery through the winding of relay 406 over conductor 433, the No. 6 back contacts of relay 200, conductor 237, the No. 3 back contacts of relay 418, the No. 8 contacts of relay 417 to ground over the No. 7 contacts of relay 401, whereupon relay 406 operates, locks over its No. 5 contacts to ground over the No. 7 contacts of relay 401, and establishes a circuit from battery through the winding of relay 229, over conductor 238, the No. 4 contacts of relay 406, the No. 4 contacts of relay 417, the upper contacts of relay 407, to ground at the No. 7 back contacts of relay 400. Relay 229 upon operating, locks over its No. 5 contacts, conductor 239 to ground at the inner lower front contacts of relay 407; disconnects the calling line discharge circuit at its Nos. 1 and 8 back contacts; opens the circuit over which relay 228 was energized at its No. 2 and No. 7 back contacts; opens, at its No. 7 back contacts, the circuit over which tone current from the source 409 was applied to the coin control circuit; connects the tip conductor of the calling line as traced over the No. 8 front contacts of relay 204, thence over the No. 8 and No. 7 front contacts of relay 229, conductor 297, link conductor 640 by way of armature *g* and front contacts of relay 626, front contacts and armature *h* of relay 630, conductor 701, middle lower armature and front contacts of relay 703 to the upper terminal of winding 717 of hybrid coil H, and connects the ring conductor of the calling line as traced over the No. 2 front contacts of relay 204, thence over its Nos. 1 and 2 front contacts, conductor 298, link conductor 641 by way of armature *f* and front contacts of relay 626, front contacts and armature *g* of relay 630, conductor 702, lowermost armature and front contact of relay 703 to the lower terminal of winding 718 of hybrid coil H. Thus, relay 715 is held operated in series with the calling line.

Upon the fourth opening of the contacts of interrupter 505, the holding circuit of counting relay 424 is opened and relay 424 now releases, in turn opening the holding circuit of relay 417 at its No. 4 contacts. With relay 424 released and relay 229 operated, relay 412 now releases and establishes a discharge path for condenser 232 through the 1600-ohm resistance 230, over conductor 416 to ground at the No. 2 back contact of relay 412.

*Automatic coin deposit request*

There has been described thus far, the initial deposit by a calling subscriber, usually a nickel, in the coin box receptacle at station 100; the receipt of dial tone by the calling subscriber; the dialing of a number indicative of a ten-cent toll call; the consequent seizure of the tandem trunk by way of the set of terminals 107 allocated to calls intended for completion in a ten-cent area; the seizure of link L in the circuit of Fig. 6; the marking of the ten-cent terminal 901 of the arc T3 of the switch T; the preparation of the coin controlled pronouncement circuit; the connection of the tone source 409 to the alternating-current signal receiver ACR by way of the pronouncement circuit; and the return of the initial deposit at the calling station.

At the upper right corner of Fig. 7 there are schematically represented two magnetic type message reproducers, or telegraphones 720 and 721. The particular form or design of these devices is not critical to the present invention but it is intended that they be operating whenever a coin controlled pronouncement circuit is taken into use. The telegraphone 720 corresponds to the trunk bank terminal set 107 which is allocated to calls for which the regular charge is ten cents, whereas the telegraphone 721 may correspond to the trunk bank terminal set 108 which, it may be assumed, is allocated to calls for which the regular toll charge is something other than ten cents. It will be understood that there are as many telegraphones 720 and 721 as there are separate terminal appearances for the tandem trunk, each corresponding to one such appearance and corresponding to a different toll charge.

Each telegraphone, such as 720 for example, is provided with a message start contact 722 which is so controlled that it is closed only during the interval between the transmission of the messages and opened during successive transmitting intervals.

It has previously been described how the ground at the lower contacts of relay 713 was substituted for the ground initially applied to the terminal 901 of the arc T3 of switch T when relay 712 operated and locked. When relay 712 operated and locked, as previously described, and when the telegraphone contact 722 is closed, a circuit for relay 724 is completed which may be traced from battery, winding and upper normally closed contacts of relay 724, conductor 726, lower front contacts of relay 725 (which relay operated in an obvious circuit under control of relay 715), conductor 727, innermost upper back contacts of relay 728, inner lower front contacts of relay 712, to ground at the telegraphone contact 722. Relay 724 operates and locks with relay 712 under control of release relay 713. This insures that the calling party will hear a complete announcement at the start.

With relays 712 and 724 operated and locked, the output of the telegraphone 720, through amplifier 723, is connected to the section 729 of hybrid coil H by way of the outermost and middle upper back contacts of relay 728. Thus the message carried by the telegraphone 720 is impressed on the hybrid coil H. This message may be in any form such as to advise the calling party to deposit ten cents for the initial period of five minutes, and may be "Please deposit ten cents."

It will be recalled that when the initial deposit of a nickel was refunded, the leads 701 and 702 now terminating at the outer terminals of windings 717 and 718 of hybrid coil H, were extended to the calling line when relay 229 operated. The message carried by the telegraphone 720 accordingly is transmitted through the hybrid coil H to the calling line over the circuit previously traced, and the calling subscriber is automatically requested to deposit the required toll for the call he has initiated, in the present case ten cents. This message is repeated each time the contact 722 of the telegraphone 720 is closed.

*Checking the deposit of coins for initial period*

Heretofore it has been described how the tone source 409 (Fig. 5) was connected through the coin controlled pronouncement circuit to the alternating-current receiver ACR when relay 408 operated. The tone source 409 is indicated as consisting of two independent frequency sources *f* and *c*, one generating a frequency *f* and the other a frequency *c*. These frequencies are impressed on the conductors 297 and 298 during the time relay 229 is unoperated and incident to the operation of relay 408 as described, and are transmitted over the conductors 297 and 298, link conductors 640 and 641 and the corresponding front contacts of relays 626 and 630, conductors 701 and 702, the two lower front contacts of relay 703 to the terminals of windings 717 and 718 of the hybrid coil H.

The frequencies *f* and *c* accordingly are transmitted through the hybrid coil H to the conductors 730 which extend from the hybrid coil H to the alternating-current receiving circuit ACR of Fig. 10. These frequencies are employed to unlock the receiver circuit ACR as will be described presently. The coin indicating frequencies generated at the coin box station 100 in a manner described, have been so chosen that a combination of two frequencies is used to identify each coin, and each frequency combination includes the common frequency *f*. For example, the choice of frequency combinations for the various coins may be as follows:

| | |
|---|---|
| Frequencies *a*, *f* | $.25 |
| Frequencies *b*, *f* | .10 |
| Frequencies *d*, *f* | .05 |

If it is assumed that the calling subscriber elects to pay for the initial call period by depositing two nickels in the coin box slot allocated to nickels, the frequencies *d* and *f* will be generated twice at the coin box of the calling station. Should he elect to deposit a dime, then the frequencies *b* and *f* would be generated but once for transmission to the receiving circuit ACR.

As hereinbefore indicated, when relay 703 operated and during the interval in which relay 229 was unoperated and relay 408 was operated, the frequencies *f* and *c* from the source 409 (Fig. 5) were transmitted over conductors 730 to the receiving circuit ACR (Fig. 10). It is deemed unnecessary to furnish a detailed description of the circuits shown in Figs. 10 and 11 in this application since a complete description thereof may be had from the aforenoted Patent 2,332,912. The elements of this receiving circuit as embodied in the present disclosure bear the same designation symbols which are employed to identify corresponding elements in the patent disclosure and their detailed functions are clearly set forth in the patent specification. Sufficient description of the circuits, however, will be included in this application to provide a clear understanding of their operation in so far as they apply to the present system. Briefly, and broadly expressed, the function of the alternating-current receiver ACR is to selectively ground certain conductors in response to the receipt of corresponding frequencies from the transmitting, or calling station, which, in the present case is the calling station 100.

The frequency combination *f* and *c* serves in the present case as a "signal present" indication and functions primarily to unlock the signal receiver ACR. The so-called "signal present" channel is connected to the volume limiter VL ahead of the channel filters BPF*a* and BPF*b*, BPF*c*, BPF*d*, and BPF*f* (it is to be noted that the channel filter BPF*e* and its related channel have been omitted in the present disclosure since it is not required) so that relay SPR will be operated when any signal of sufficient magnitude is available at the output of the limiter, whereas the channel relays R*a*, R*b*, R*c*, R*d* and R*f* will be operated only when frequencies passable through their correlated channel filters are present in the signal.

As previously indicated, frequencies *f* and *c* are supplied from the source 409 and reach the receiver ACR over the conductors 730 extending from hybrid coil H. The currents of frequencies *c* and *f* pass through the pad AP, the filter HPF and the left winding of transformer IT with the grounded resistance IN bridged thereacross. The signal voltage developed thereby in the left winding of transformer IT is induced in the right winding, amplified through the limiter VL, and then applied, partly across resistance N1 and partly across resistance N5, the former being applied to the left winding of transformer SPT of the "signal present" circuit, and the latter, through resistances N2, N3 and N4, to the input terminals of the channel filters BPF*a*, BPF*b*, etc. Since the filters BPF*c* and BPF*f* are each tuned to pass one of the two frequencies in the signal from source 409, the voltage thereof is applied to the grid electrodes of vacuum tubes T*c* and T*f* through resistances C*g* and F*g* but not to any of the other channel tubes.

Each of the channel tubes T*a*, T*b*, etc., as indicated in the aforementioned Hecht et al. patent, functions as a detector. Each channel is also provided with its own individual relay R*a*, R*b*, etc., the secondary winding (S) of each of which is connected in the anode circuit of its associated vacuum tube. The primary windings (P) of these channel relays are connected in series and obtain battery through the filter coil FLT. The other end of the series connection of the primary windings (P) of relays R*a*, R*b*, etc., is connected to resistance CH1 and thence through conductor L, the No. 1 armature contacts of relay CI2 of the coin adding and register circuit and conductor J to the upper contact of relay SPR.

Consequently, when frequencies *c* and *f* are transmitted to the circuit ACR, voltage derived from the signal is applied to transformer SPT to cause the operation of tube S and that of its anode relay SPR which, upon operating, applies ground to the conductor J and thence to conductor L as hereinbefore described, to energize the primary windings of channel relays R*a*, R*b*, etc.; and voltage derived from the signal is applied to the grid electrodes of tubes T*c* and T*f*, respectively. The interconnections of conductors J and L depend also upon the operation of a relay CI1, CI2 or CI3 of the coin register and adding circuit. The application of this voltage to the grid electrodes reduces the value of the positive potential between grid and cathode normally thereon from battery through coil FLT and networks P4 and P5 in consequence of which the respective anode currents flowing through these tubes and the secondary (S) or bias winding of relays R*c* and R*f* are reduced, causing these two relays to primary on the current through their operate winding (P). It will be noted that the current which causes the operation of relays R*c* and R*f*, while flowing through the operate winding (P) of all the channel relays, will only cause the operation of the two relays R*c* and R*f* since the current in the secondary winding (S) of each of the other channel relays has not been diminished by any material alteration in the control grid potentials of their respective tubes.

With relays R*c* and R*f* thus operated, ground is disconnected from conductors 5 and 12, which remove ground from the secondary winding (S) of relay KP1, the path of the ground being by way of the No. 1 normally made contacts of relays KP2 and KP3 and through the armature and left contact of relay KP1.

Relay KP1 now operates slowly over an obvious circuit through its operate winding (P), the slowness of its operation being due to the charging current for condenser KPC flowing through its secondary winding (S) and resistance KPR1, which current opposes the current flowing through the primary winding (P). When the condenser KPC is completely charged, the current flowing through the winding (S) of the relay is limited by the high resistance KPR, and since the resulting magnetic flux is smaller than that produced by the current flowing through the primary winding (P) the relay is caused to operate.

Now when the signal from the tone source is terminated due to the operation of relay 229 as described, the release of either relay R*c* or R*f* will cause ground to be connected to conductor 5 or 12, respectively. Since these two conductors are joined at the No. 1 normally made contacts of relays KP2 and KP3 and since relay KP1 is now operated, the ground on conductor 5 or 12, or both, is applied to the winding of relays KP2 and KP3 via the armature and right contact of relay KP1. Since battery is connected to the other terminals of the windings of each of these two relays by conductor BAT2, both relays will operated and lock to ground on the No. 5 contacts of relay KP2. Relay KP2, over its No. 8 front contacts, now reapplies ground to the secondary winding (S) of relay KP1, increasing the current flow therethrough in consequence thereof and causing relay KP1 to release and reestablish its armature into engagement with the left contact.

Figure 5:
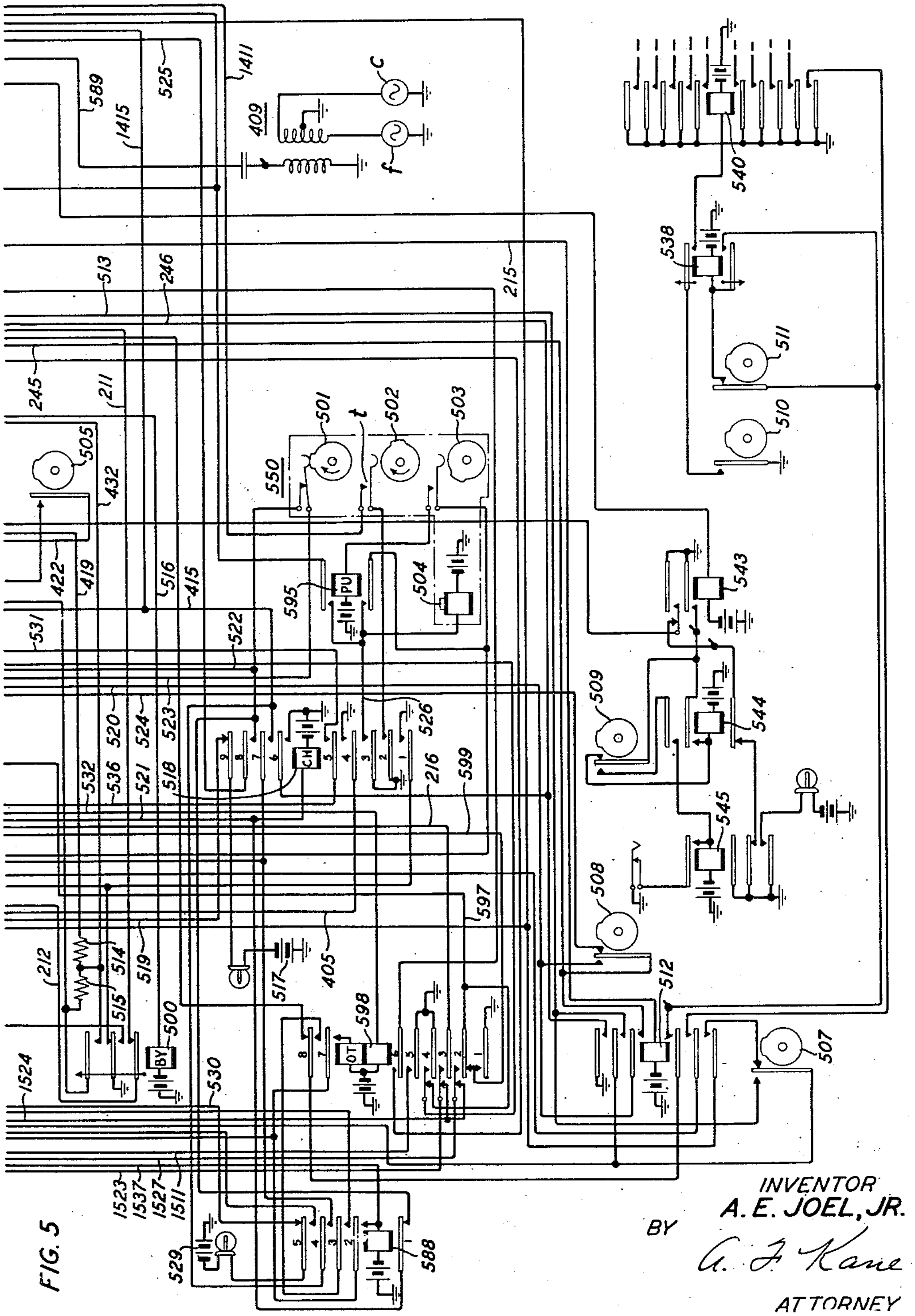

Relays KP2 and KP3, upon operating, perform the general function of extending the upper contacts of the channel relays R*a*, Rb, etc., to conductors A, B, D and F, the conductor F being connected to the armature of each of the relays 1100, 1101 and 1102, and conductors D, B and A being connected to the windings of these relays, respectively. Thus, subsequent operations of relays R*a*, R*b*, R*f* and R*d* in various combinations will cause relays 1100, 1101 and 1102 to be selectively operated. Thus, the receiver ACR is "unlocked" as evidenced by the operation of relays KP1, KP2 and KP3 incident to the transmission of frequencies *c* and *f* over conductors 730 from the source 409 (Fig. 5).

As previously indicated, the coins deposited at station 100 are identified by the transmission of various combinations of two frequencies *a*, *b*, *d* and *f*, sent simultaneously. In the present case of a ten-cent call, it will be assumed that the calling party elects to deposit a dime in payment for the initial period. Frequencies *b* and *f* accordingly will be generated at the station 100 and transmitted to the receiver ACR over the circuit previously indicated. It is believed unnecessary to describe in detail how each transmitted frequency functions in the circuit ACR. Suffice it to say that relay R*f* responds to the frequency *f*, to apply ground to conductor F and relay R*b* to the frequency *b*, to apply ground to conductor B.

When relay 703 operated incident to the operation of relay 712 as previously described, at its innermost lower armature and front contact it extended the now grounded sleeve conductor 704 to the upper armature and back contact of relay 713 and thence to battery through the winding of relay 714. Relay 714 operates in this circuit and at its outer upper armature and front contact applies ground to the contact of timing cam 733 of the timing-out circuit TS to start the timing-out cycle which will be described hereinafter. At its inner upper armature and front contacts relay 714 applies ground to conductor 734 which serves to hold relay 635 locked in its operated position and also to cause the energization of the upper winding of relay 627 over the innermost contacts of operated relay 635. Relay 627, operated, locks under control of relay 1207 and, at its upper contacts, removes ground from the armatures of the trunk preference relays such as relays 624 and 625. Relay 626, however, will not release since it is locked operated to ground at the innermost upper front contacts of relay 630.

At its innermost lower armature and front contact, relay 714 connects ground to conductor 735, over conductor 800, No. 6 back contacts of relay CI2, contacts 801 of relay R51, contacts 802 of relay R101, contacts 803 of relay R251, to battery through the winding of relay CI1. Relay CI1 of the coin register and adding circuit (Fig. 8) operates in this circuit thereby preparing the so-called nickel, dime and quarter relays R51, R101 and R251, respectively, of the first register for selective operation under control of the alternating-current signal receiver ACR once relays KP1 and KP2 have operated.

When the dime is deposited in the coin box chute allocated for such coin, frequencies *b* and *f* are generated at the station 100 and transmitted to the receiver circuit ACR to cause relays R*b* and R*f* to operate, causing the application of ground to conductors B and F (Fig. 11). The grounding of conductor B causes relay 1101 to operate over an obvious circuit. Relay 1101, upon operating, connects the now grounded conductor F to conductor 804 to cause the operation of the first register dime relay R101 over the No. 4 front contacts of relay CI1.

Relay R101, operated, locks in a circuit which is traced from battery, through its winding and its contacts 805, normally closed contacts of relay AI1, conductor 735 to ground at the front contact and innermost lower armature of relay 714. With relay R101 operated, the operating circuit for relay CI1 is opened at contact 802 whereupon relay CI1 releases and, at its No. 1 contact, opens the J—L circuit to the receiver ACR causing relays R*b* and R*f* to release in a manner fully described in the aforementioned Patent 2,332,912.

Relay CI2 of the second register now operates in a circuit extending from battery, through its winding, contacts 806, 807 and 808 of the second register relays R252, R102 and R52, respectively, contacts 809 of relay R101, the No. 6 contacts of relay CI1 (released) to ground at the innermost lower armature and front contact of relay 714 by way of conductors 800 and 735. The operation of relay CI2 is preparatory to the registering of the next coin, if any, deposited by the calling party at station 100. At its No. 7 front contacts relay CI2 extends the ground on conductor 800 to conductor 810 and thence over the upper normally closed contacts of relays 737 and 736, to battery through the winding of relay 728. Relay 728 operates in this circuit and, at its outermost and middle upper armatures, disconnects the telegraphone 720 from the calling line thereby discontinuing the tariff request pronouncement. Thus when relay CI2 operates, it indicates the receipt of the first coin signal by the coin adding and receiving circuit and transmits this information to the telegraphone cut-off relay 728 to cause it to effect the discontinuance of the transmission of the pronouncement carried thereby. Relay 728 locks by way of its lower contacts under control of relay 713.

When relay CI1 released, it caused relay AI1 to operate in a circuit extending from battery through the winding of relay AI1, over the inner upper front contacts of relay R101, upper back contacts of relay R51, the No. 2 back contacts of relay CI1, conductor 811, normally closed No. 7 contacts of relays AI2 and AI3 to ground on conductor 735 as previously traced. With relays R101 and AI1 operated, a circuit is completed extending from ground at 813, over the No. 7 contacts of relay AI1, upper front contacts of relay R101, the No. 5 contacts of relay AI1, conductor 814, brush of arc AIS3 of switch AIS, terminal 815 thereof, conductors 816 and 817 to terminal 818 of arc T2 of totalizing selector T. This ground marks the terminal 818 of arc T2, of the switch T and determines the number of steps to be taken by the switch T.

When relay AI1 operated, a circuit for stepping magnet 920 of selector switch T is established which extends from battery, winding and interrupter contacts of magnet 920, lower back contacts of relay 921, conductor 900, the No. 3 contacts of relay AI1, to ground on conductor 735 as previously traced. At its No. 1 front contacts relay AI1 transfers the locking circuit of relay R101 to conductor 819 and thence to ground on conductor 735 by way of the lower back contacts of relay 922, conductor 900, and the No. 3 contacts of relay AI1.

Magnet 920, upon operating, steps the selector T around in well-known manner and its stepping operation continues until the brush of arc T2 encounters the marked terminal 818. Selector T therefore advances two steps. Relay 921 then operates over an obvious circuit; opens the operating circuit to stepping magnet 920; and locks to ground on conductor 900 as previously traced. At its lower front contacts, relay 921 extends the ground on conductor 900, by way of the upper armature and back contacts of relay 922, to the interrupter contacts and winding of stepping magnet 924 of switch AIS to battery. With its operating circuit open, the stepping magnet 920 ceases operating and the selector T comes to rest on the marked terminal 818 as described.

When the selector switch T ceases stepping, the brushes of the several arcs thereof are situated as follows: brush of arc T1 rests upon terminal 923; brush of arc T2 rests upon terminal 818; brush of arc T3 rests upon terminal 901 to which the ten-cent charge lead 1213 has been connected; and the brush of arc T4 rests upon terminal 904.

It will be observed that the terminal 923 of arc T1 of selector T is strapped to the terminal 925 of arc AIS1 of the selector AIS. Thus, under the action of stepping magnet 924, whose operating circuit was completed when relay 921 operated as described, the selector AIS steps its brushes around until the brush of arc AIS1 encounters terminal 925. When this occurs, relay 922 operates to open the circuit to stepping magnet 924 and thus stop the selector. The operating circuit for relay 922 may be traced from battery through its winding and its normally closed lower contacts, brush and terminal 925 of arc AIS1 of selector AIS, terminal 923 and brush of arc T1 of selector T, lower front contact of relay 921 to ground on conductor 900 as previously traced. Relay 922 locks to ground on conductor 900 and, at its lower back contacts, opens the locking circuit for relay R101. Relay R101 thereupon releases causing relay AI1 to release. Relay AI1 upon releasing removes ground from conductor 900 causing relays 921 and 922 to release.

With the switches now set as described, selector T having advanced two steps as determined by the grounding of the brush of arc AIS3 incident to the operation of the dime relay R101 in the first register of the coin register and adding circuit, which brush rested upon terminal 815 which is strapped to the terminal 818 of arc T2 of selector T, relays 820 and 821 operate in parallel over conductor 822, brush of arc T3 of selector T and terminal 901, to ground on charge conductor 1213. Relay 820 locks to ground on the off-normal ground conductor 735. With all relays AI1, AI2 and AI3 released, the ground on conductor 735 is extended to the lower armature of relay 820, and thence over its front contact, conductor 823, brush of arc T4 of selector T and terminal 904 thereof, the interterminal strappings of arc T4, interrupter contacts and winding of stepping magnet 920 to battery. The stepping magnet 920 operates in this circuit and steps the selector T around to its normal position in which the brush of arc T4 thereof rests upon terminal 927. The ground on conductor 823 is thus transferred to the brush of arc AIS5 of selector AIS, to terminal 926 thereof, thence over the interterminal strappings of arc AIS5, interrupter contacts and winding of stepping magnet 924 to battery. Stepping magnet 924 operates in this circuit to step the selector AIS to its normal position. Thus both selectors are restored to normal.

With relays 820 and 821 operated and both selectors T and AIS restored to normal, a circuit is completed extending from ground on conductor 735, the No. 7 normally closed contacts of relays AI3 and AI2, the No. 2 contacts of relay AI1, lower contacts of relay 820, conductor 823, brush of arc T4 and terminal 927 of selector T, brush of arc AIS5 and terminal 928 of selector AIS, conductor 825, lower front contacts of relay 821, "advance" conductor 831, the No. 2 contacts of relay 716, to battery through the winding of release relay 713.

Relay 713 operates in this circuit. At its lower contacts relay 713 removes the locking ground for relays 703, 712, 728 and 724 causing these relays to restore their armatures. Relay 714 now releases, its operating circuit being opened at the upper contacts of relay 713 and also at the innermost lower contacts of relay 703. The effect of the opening of the sleeve conductor 704 at the innermost lower contacts of relay 703 will be set forth hereinafter.

When relay 703 releases, the windings 717 and 718 associated with hybrid coil H are disconnected from the tip and ring conductors 701 and 702. Relay 714, released, removes ground from the timing circuit TS; removes ground from conductor 734 causing the release of link relays 627 and 630 which release and open the circuit for trunk connector relay 626 causing the release of this relay which disconnects the link L from the trunk.

Relays 715 and 725 now are released. Relay 715 releases upon the release of relay 703 as described. Relay 713 releases when relay 714 released and removes ground from lead 735, thus, the circuit of Fig. 7 is restored to normal.

*Timing-out circuits TS*

It will be recalled that relay 714 operated over the sleeve conductor 704 when relay 703 operated incident to the operation of charge relay 712. The operation of relay 714 at that time connected ground to the contact of timing cam 733. If the calling subscriber fails to deposit a coin as requested by the pronouncement carried by the telegraphone 720, the apparatus involved in registering and totalizing the deposited coins would be tied up unless some precautions to preclude this possibility were taken.

Thus, when the timer cam 733, which is constantly rotating under any well-known type of control, first functions to close its alternate contacts, relay 738 operates in an obvious circuit and locks under control of relay 714. When the cam 733 rotates sufficiently far to remake its normal contacts, relay 739 operates in an obvious circuit which includes the lower armature and front contacts of relay 738. Relay 739 also locks under control of relay 714.

At its upper contacts, relay 739 establishes an obvious operating circuit for relay 737. With relay 737 operated, lamp 740 located at a monitoring operator's position is lighted in a circuit traced from battery, filament of lamp 740, inner back contacts of relay 710, upper back contacts of relay 741, upper front contacts of relay 737, to ground at the outermost lower back contacts and armature of relay 716.

Upon noting the lighted lamp 740, the monitoring operator would insert a plug of her cord (not shown) into jack 744 associated with lamp 740. Ground associated with the sleeve conductor of the monitoring operator's cord is extended over the sleeve contact of jack 744 to battery through the winding of relay 741. Relay 741 operates in this circuit and at its upper back contact opens the circuit for monitoring lamp 740, causing this lamp to be extinguished. Relay 716 now operates in a circuit traced from battery, winding of relay 716, inner lower front contacts of relay 737, lower front contacts of relay 741 to ground. Relay 716 locks under control of relay 714 and at its first and second lower armatures and contacts, extends the tip and ring conductors of the calling line to the terminals of jack 744 and disconnects the supervisory relay 715 from the line.

It will now be noted that with relay 716 operated and the monitoring operator's cord plugged into jack 744, the monitoring operator is in a position not only to converse with the calling party but also to listen to the pronouncement being transmitted over the calling line. The system is so devised that the monitoring operator receives the pronouncement carried by the telegraphone which insures her of knowing what tariff the calling party has been requested to deposit in the coin box at station 100. This is effected in the following manner by relays 736 and 745. With relays 712 and 741 operated, and relay 728 unoperated, the ground from the telegraphone "no message" contact 722 is transmitted to battery by way of the lower normally closed contacts and winding of relay 736 and resistance 734, and through the resistance 746 by way of the back contacts of relay 745. Relay 745 is normally short-circuited by its own back contacts and the lower normally closed contact of relay 736. Relay 736 accordingly operates on the first ground pulse from the contact 722 whereas relay 745 does not operate. Relay 736 locks to ground at the lower back contacts of relay 713. During the interval relay 736 is operated and relay 745 is released which corresponds to the pronouncement transmitting time for telegraphone 720, the output of the telegraphone is impressed on the winding 729 of the hybrid coil H and is thus transmitted through the repeating coil R to the calling line and to the monitoring operator's telephone, it being understood that both relays 703 and 716 are operated as described. The operator thus hears the pronouncement carried by the telegraphone 720 and is advised of the tariff rate for the call initiated by the party at station 100.

When the contact 722 is opened at the end of the pronouncement period, ground is removed from one of the terminals of relay 745 so that this relay now operates in a circuit extending from grounded battery, resistance 746, winding and normal contacts of relay 745, locking contacts of relay 736 to ground at the lower back contact of relay 713. With relay 745 operated, the pronouncement cut-off relay 728 operates in an obvious circuit and, at its outermost and middle upper armatures, disconnects the telegraphone output from the hybrid coil H. When the contact 722 again closes, relay 736 is short-circuited and releases. In releasing, relay 736 is prevented from establishing a short-circuit about relay 745 by a lower break contact on that relay. With relay 728 operated and now locked at the upper normally closed contacts of relay 736, further closures of the telegraphone contact 722 are ineffective to operate relays 736 and 745.

The operator may now converse with the calling party at station 100 and take whatever steps may be required under the circumstances.

*Completion of the desired connection*

When the selector switches T and AIS have functioned to indicate the deposit of an amount in the coin box at station 100 which checks with the required tariff indicated by the marking of the terminal 901 of arm T3 of selector switch T allocated to ten-cent tariffs, the initiated call is allowed to advance to completion. The deposit of the correct amount is indicated by the joint operations of relays 820 and 821 which combine to apply ground to the advance lead 831 as previously described.

When relay 703 releases, as previously described, the sleeve conductor 704 is opened thus opening the operating circuit for relay 407, it being recalled that relay 407 operated in series with relay 714 over the sleeve conductor. When relay 407 releases, it releases relays 204, 229 and 403. Relay 204 upon releasing again connects the windings of relay 213 to the calling line and restores supervision to the tandem trunk. Relays 408 upon releasing establishes the circuit of relay 200 which may be traced from battery through its winding over conductor 242, the No. 8 contacts of relay 406, the No. 9 back contacts of relay 408, conductor 211, the inner upper back contacts of relay 500, conductor 212 to ground at the No. 3 normal contacts of relay 400. Relay 200 upon operating, locks over conductor 242, the No. 8 contacts of relay 406, conductor 243, its own No. 5 contacts to ground on conductor 212; opens the circuit of relay 201 at its No. 7 back contacts, whereupon relay 201 releases; and over its Nos. 2 and 8 front contacts completes a talking circuit between the calling line and outgoing conductors 302 and 303 of the tandem trunk and bridges the winding of polarized relay 244 across such outgoing trunk conductors. The operation of relay 200 also opens the locking circuit of relay 207 and relay 207 releases.

With relay 200 operated, a circuit is established from battery through the winding of relay 321 at the tandem sender, over the lower normal contacts of relay 320, the upper alternate contacts of relay 307, the back contacts of relay 306, contacts of cam 305, trunk conductor 302, the No. 8 front contact of relay 200, the winding of polarized relay 244, the No. 2 front contacts of relay 200, trunk conductor 303, contacts of cam 313, the back contacts of relay 312, the inner lower alternate contacts of relay 307, the upper normal contacts of relay 320 to ground through the winding of relay 322 at the tandem sender. The current flowing over this circuit through the winding of polarized supervisory relay 244 is in such a direction as to operate the armature thereof against its right contact. Relays 321 and 322 at the tandem sender are both now operated, in turn operating relays 323 and 324. With relay 324 operated, the circuit of relay 325 is opened at its back contacts and relay 325 releases to make the start circuit for the timing-out of the tandem sender operative to function in the usual manner. A circuit is also established from ground over the lower front contacts of relays 323 and 324 through the winding of relay 327 to battery, whereupon relay 327 operates and locks in a circuit over its lower contacts, the inner upper contacts of relay 326 and the upper front contacts of relays 324 and 323 to ground. Relay 336 is also operated in a circuit from battery through its winding, over the upper front contacts of relays 324 and 323 to ground and, upon operating, locks over its lower front contact, the lower front contacts of relay 327 to ground over the lower front contacts of relays 324 and 323. Relay 327, upon operating, opens the locking circuit of relay 326 which relay thereupon releases, in turn opening the locking circuit of relay 327, but relay 327 is now held operated under control of relays 323 and 324 and relay 336 over a locking circuit extending over its lower front contacts, the lower front contacts of relay 336 to ground over the upper front contacts of relays 323 and 324. With relay 327 operated, the fundamental circuit is established over its upper contacts through the winding of trunk test relay 337, contacts of cams 338, 339 and 347 of the sender and contacts of cams 340 and 341 in the tandem district selector. The tandem sender now proceeds to complete the desired connection in accordance with the digital information registered therein in the usual manner. When the connection is completed, the tandem sender is dismissed and the sequence switch of the tandem district selector is advanced to the trunk closure position in which position a circuit is established from battery through the left winding of relay 342, the upper back contacts of relay 343, the upper left winding of repeating coil 344, contacts of cam 305, trunk conductor 302, the No. 8 front contacts of relay 200, winding of relay 244, the No. 2 front contact of relay 200, conductor 303, contacts of cam 313, the lower left winding of repeating coil 344, the lower back contact of relay 343 to ground through the right winding of relay 342. The direction of the current flowing is still in such a direction as to hold the armature of relay 244 against its right contact.

*Response of the called subscriber*

When the called subscriber answers, a circuit is completed which may be traced in part over the contacts of cam 341, through the upper right winding of repeating coil 344, winding of supervisory relay 345, contacts of cam 346, the lower right winding of repeating coil 344 and the upper contacts of cam 340 to cause the operation of relay 345 which is followed by the operation of reversing relay 343. Relay 343, upon operating, reverses the connections of battery and ground through the windings of relay 342 to the trunk conductors 302 and 303, whereby current now flows in such a direction through the winding of polarized relay 244 to cause the armature to move into engagement with its left contact. As soon thereafter as interrupter cam 508 closes its left contact, a circuit is established from ground over the No. 4 contacts of relay 200, the left contact of relay 244, conductor 245, left contact of interrupter 508, conductor 520 to battery through the winding of relay 434, which relay thereupon operates and locks over its inner upper contacts to ground applied to conductor 245 by relay 244. As soon thereafter as interrupter 508 closes its right contact, relay 434 establishes a circuit for relay 518 which may be traced from battery through its winding, over conductor 521, the No. 3 back contacts of relay 435, conductor 522, contacts closed by cam 501 of the charge timer 550, which timer is in its normal position, conductor 523, the No. 5 back contacts of relay 435, conductor 599, the No. 2 back contacts of relay 598, conductor 597, the lower front contact of relay 434, conductor 524, over the right contact of cam 508 to ground on conductor 245. Relay 518, upon operating, locks in a circuit extending from battery through its winding, over conductor 521, the No. 3 back contacts of relay 435, conductor 522, the No. 8 contacts of relay 518, conductor 525, the No. 5 back contacts of relay 417 to ground over the No. 6 contacts of relay 406; connects ground over its No. 4 contacts to conductor 405 to hold relay 401 operated; establishes an operating circuit for relay 512 which may be traced from battery through its winding, over conductor 215, the No. 3 front contacts of relay 200 and conductor 246 to ground over the No. 6 contacts of relay 518, and starts the charge timer 550 for measuring the initial period for conversation by operating clutch magnet 504. The circuit for magnet 504 may be traced from battery through its winding, over conductor 526, the No. 3 contacts of relay 518 to ground. The operation of clutch magnet 504 causes rotation of a timer 550 comprising cams 501, 502 and 503, one cycle per minute, cam 501 closing its contact while in normal position. Cam 502 closes its contact for 30 seconds during each cycle, causing operation of relay 1410. Relay 1410 closes a circuit for operating relay 1412 and relay 1412 closes a circuit for operating stepping magnet 1414. Cam 503 closes its contact operating relay 595, locking relay 1412 until the end of the cycle. When relay 595 releases, relay 1412 releases, and stepping magnet 1414 releases thereby advancing the brushes of switch TM one step. Thus switch TM is advanced one step at the end of each minute measured by the timer 550. When four minutes have elapsed, the brush of arc 1 of switch TM engages terminal *a* thereby completing a circuit for operating relay 412. This circuit is traced through conductor 413, a back contact of relay 229, conductor 415, conductor 1415, terminal *a* and brush 1 of switch TM, a front contact of relay 1401 and a front contact of relay 1410.

Relay 412, upon operating, connects ground to one contact of interrupter cam 505, connects the two low resistances 514 and 515 across the calling line and removes ground applied over conductor 416 from the line discharge network comprising resistances 230 and 231 and condenser 232 in a manner described in connection with its previous operation. Under the control of interrupter 505, counting relay 423 is operated upon the first closure of the interrupter contacts and prepares the operating circuit for counting relay 424 which thereafter operates upon the following opening of the interrupter contacts. With both relays 423 and 424 operated, resistance 515 is short-circuited thus reducing the resistance bridged across the calling line to 50 ohms and relay 500 is operated to shunt resistance 514, thus further reducing the bridged resistance to zero. The application and reduction of the shunt across the calling line is for the purpose of diverting the current from the line prior to the connection of coin control battery thereto in order to prevent disturbances from reaching the called subscriber through the tandem and terminating office equipment. Upon the second closure of the contacts of interrupter 505, relay 423 is released and relay 424 is locked in its operated condition. The operating circuit of relay 500 is now opened and the operating circuit of relay 204 is closed to operate relay 204 and thereby disconnect the windings of relay 213 from the calling line while it is still short-circuited. Relay 204 locks operated over conductor 427 and the No. 6 contacts of relay 412, under the control of relay 435; transfers trunk conductors 205 and 206 in preparation for coin collection; and establishes the operating circuit for counting relay 418 which thereupon operates. These functions are all performed in the manner previously described.

*Collection of coins deposited for initial period*

With relay 418 operated, coin collecting battery is connected from the source 529, over the No. 5 contacts of relay 588, conductor 530, the No. 4 back contacts of relay 435, conductor 536, the No. 5 contacts of relay 518, conductor 531, the No. 1 back contacts of counting relay 417, the No. 4 contacts of relay 418, conductor 431, over the Nos. 1 and 8 back contacts of relay 229, and the Nos. 2 and 8 front contacts of relay 204, thence over the tip and ring conductors of the established connection, through the magnet of coin box 101 to ground over contacts closed thereat by the deposited coin. The coin box magnet is now energized in such a manner as to transfer the previously deposited coin or coins in the coin box till. In the present case the calling party deposited a dime as previously described. Upon the second opening of the contacts associated with cam 505, relay 424 is released and relay 417 is operated in the manner previously described to open the circuit over which coin collecting current was applied to the coin box 101. Upon the third closure of the contacts associated with cam 505, relay 423 again operates and with relay 417 operated the capacity charge of the calling line is dissipated over the tip and ring conductors of the line extended through the operation of relay 204 to the Nos. 1 and 8 back contacts of relay 229 and thence through resistances 230 and 231 and condenser 232 to ground.

Upon the third opening of the contacts of interrupter cam 505, relay 424 operates and upon the fourth closure of the interrupter contacts relay 423 releases, in turn releasing relay 418 in the manner previously described. With relay 200 operated as previously described, and with relay 417 operated and relay 418 released, relay 435 operates in a circuit traced from battery through its winding, conductor 437, the No. 6 front contacts of relay 200, conductor 237, No. 3 contacts of relay 418, No. 8 contacts of relay 417, to ground at the No. 7 contacts of relay 401. Relay 435 locks by way of its No. 2 contacts to conductor 437 as previously described, opens the locking circuit of relay 204 at its No. 1 back contacts, whereupon relay 204 releases to reconnect the windings of relay 213 to the calling line; and, at its No. 3 back contacts opens the locking circuit to relay 518 which relay thereupon releases. Upon the fourth opening of the contacts of interrupter 505, relay 424 releases followed by the release of relays 417 and 412. Relay 412 upon releasing discharges condenser 232 through the 1600-ohm resistance 231. Relay 204 has been operated for an interval of 1.2 to 1.7 seconds during the collection of the deposited coin at station 100.

The charge timer 550 continues its operation having been started when relay 518 operated incident to the response of the called subscriber. When the brush of arc 1 of switch TM engages terminal *b*, thirty seconds before the end of the first overtime period, relay 598 is operated in a circuit traced from its lower winding, conductor 532, a front contact of relay 435, conductor 423, contact of cam 501, conductor 522, inner lower front contact of relay 435, conductor 245, front contact of relay 244, and a front contact of relay 200. Relay 598 locks through its upper winding under control of relay 401.

*Overtime start warning pronouncement*

A magnetic tape recorder or telegraphone 1505 (Fig. 15) common to all trunks is provided to announce to the calling party that the overtime period is about to start and that overtime charges will be requested when the called party disconnects at the end of the call. In addition, the subscriber is informed that a tone signal will be sent 30 seconds before the beginning of each new overtime period. This message is carried by the telegraphone 1505 whose functioning will now be described.

A "no message" contact 1506 associated with the telegraphone 1505 is synchronized with the message on the telegraphone tape so as to close when no message is present, thus causing the operation of relay 1507 which is common to all trunks using this machine. With relay 598 operated, relay 1508 now operates in a circuit extending from grounded battery, over resistance 1509, winding of relay 1508, and its lower normal back contacts, the back contacts and innermost armature of relay 1510, outermost lower front contacts of relay 1507, conductor 1511, No. 5 contacts of relay 598 to ground. Relay 1508 locks to ground at the No. 7 contacts of relay 401.

Relay 1508, operated, connects the tip and ring conductors 205 and 206 of the trunk to the magnetic tape recorder 1505 by way of the condensers 1512, repeating coil 1513 and amplifier 1514. The prerecorded message of the telegraphone 1505 thus, is transmitted over the established connection and informs the calling subscriber that the overtime period is about to start and that he will receive a tone signal 30 seconds before the start of each subsequent overtime period.

When the transmission of this warning message starts, contacts 1506 open causing the release of relay 1507. With relay 1507 released, relay 1510 operates in a circuit extending from grounded battery, over resistance 1515, winding of relay 1510 and its upper normally closed contacts, front contacts and outer lower armature of relay 1508 to ground by way of the No. 7 contacts of relay 401.

When contacts 1506 again close, the message has been concluded and relay 1507 reoperates. Relay 1508 is now shunted and releases to disconnect the telegraphone from the talking conductors and transferring one of these conductors, 1503, to the armature of tone relay 1516 to prepare to send a tone signal from source 1517, thirty seconds prior to the start of each overtime period.

As hereinbefore stated, timing switch TM continues to step on each completed minute of timing with relay 1410 operating thirty seconds before the conclusion of each one-minute period. Thirty seconds before the end of the first overtime period as determined by terminal *b* of arc 1 of switch TM the switch brush engages terminal *b* causing relay 1516 to operate in a circuit extending from grounded battery, through its winding, over conductor 1520, terminal *b* of arc 1 of switch TM and the corresponding brush, front contact and upper armature of relay 1401, to ground by way of the front contact and upper armature of relay 1410. Relay 1516, operated, connects the tone source 1517 to conductor 1503 of the established connection to effect the transmission of a tone signal to the calling station 100. This signal is connected to the trunk for the short period while timer contact *t* and relay 1410 are operated. The calling subscriber having previously been informed of the tone signal and its significance when telegraphone 1505 was connected to the line, may continue the call for another 30 seconds and then disconnect, or may continue for another overtime period. In the event of the latter the brush of arc 1 of switch TM would engage contact *c* when four and one-half minutes of the second overtime period has been concluded and would thus effect the reconnection of the tone source 1517 to the line to again advise the calling subscriber that the overtime period was nearing its end.

*Request for overtime charges*

It will be assumed, for descriptive purposes that the connection is terminated at the end of the first overtime period. The request for and collection of the overtime charge for the call is started by the disconnect of either the called or calling subscribers. If the calling subscriber disconnects, ringing current is applied to his line in an attempt to recall him for the purpose of requesting and collecting the overtime charges. If after a brief period he fails to answer the ringing signal, the connection is set up to a coin control circuit which immediately brings in a monitoring operator. If the calling party remains at his telephone and only the called party disconnects the coin control circuit is connected immediately.

It will be observed that at the termination of the first overtime period when the call was terminated (as assumed) the brush of arc 6 of switch TM will have advanced ten steps and now is in engagement with terminal 10 which is permanently connected to the armature *d* of relay 1202 by way of conductor 1419. This position of the brush of arc 6 indicates the call has been in progress for a ten-minute interval made up of five minutes initial period and five minutes overtime. It will be observed further that the contact associated with armature *d* of relay 1202 is tied to the contact associated with armature *d* of rate relay 1203 which armature is connected to the 30 cents terminal associated with the armature *d* of relay 1211. Thus, the common charge rate translator link is conditioned to inform the coin control tariff pronouncement circuit (Fig. 7) that the terminated call is to be charged 30 cents for overtime service.

It will be assumed now that the called party disconnects and that the calling party at station 100 remains on the connection.

When relay 401 initially operated, as described, relay 1522 operated in a circuit including conductor 1523, the normally closed No. 3 contacts of relay 598, conductor 1524 to ground by way of the No. 1 contacts of relay 401. After relay 598 operates, relay 1522 is held directly to ground by way of the lower contacts of calling supervisory relay 213, conductor 216, the alternate No. 3 contacts of relay 598 and conductor 1523. Relay 1522 is made slow to release to prevent false release on line surges.

Relay 1525, it will be observed, like relay 1522 is operated initially when relay 401 operated. When relay 598 operates, relay 1525 is held operated in a circuit which may be traced from grounded battery, through the winding of relay 1525, the No. 2 contacts of relay 1526, conductor 1527, alternate No. 2 contacts of relay 598, conductor 597, lower front contacts of relay 434, conductor 524, right contacts of cam 508, conductor 245, left contacts of called supervisory relay 244, to ground over the No. 4 contacts of relay 200. Relay 1525 is also slow to release to prevent false release due to line surges.

When the called supervisory relay 244 releases indicating a called party release, the above-traced circuit for relay 1525 is opened and relay 1525 releases. Relay 1525, released, operates relay 1526 in a circuit extending from grounded battery, through the winding of relay 1526, upper contacts of relay 1525, front contacts of relay 1522, conductor 1511, to ground by way of the No. 5 contacts of relay 598. Relay 1526 operates and at its No. 3 contacts completes an operating circuit for relay 217 which includes conductors 275 and 1540, the No. 2 contacts of relays 401 and 407.

Relay 217, in a manner previously described, again operates trunk preference relay 624 to initiate the seizure of the common charge rate translator link circuit and the eventual seizure of link L. It is believed unnecessary to repeat the details of the seizure of these links as a full description thereof was made hereinbefore. Suffice it to say that relays 1202, 1203 and 1211 eventually operate as do also relays 626 and 630, the latter two interposing the link L between the involved trunk and the coin control pronouncement circuit (Fig. 7), and the former three functioning to extend the now grounded time lead 1419 to charge conductor 1215 which extends to battery and ground through the winding of a charge relay such as relay 750 and also to contact 950 of arc T3 of switch T (Fig. 9).

Relay 750 performs in a manner similar to relay 712, previously described, except that the telegraphone 721 is connected to the calling line instead of the telegraphone 720 and informs the calling party to deposit thirty cents, which is the tariff rate (overtime) identified by the charge conductor 1215 over which relay 750 was operated.

Heretofore, it has been described under the headings "Initial Response of Request Pronouncement Circuit" and "Automatic Coin Deposit Request" how the system functions incident to the operation of a charge relay such as relay 712 and the consequent connection of the corresponding telegraphone 720 to the trunk. The system functions in the same manner incident to the operation of charge relay 750 and the consequent connection of the telegraphone 721 to the trunk. No further or repeated descriptions are believed necessary for a complete understanding of tthe functioning of the system in requesting overtime charges.

*Deposit and checking of overtime charges*

The calling subscriber having been advised, through the medium of the telegraphone 750, that the overtime charge is thirty cents proceeds to deposit the requested amount in the coin box at station 100.

Heretofore and in connection with the initial deposit of toll tariff it has been described how the tone source 409 (Fig. 5) was connected through the coin controlled pronouncement circuit to the alternating-current receiver ACR when relay 408 operated. As in the previously described situation the tone source 409, in the present case, is indicated as consisting of two independent frequency sources *f* and *c*, one generating a frequency *f* and the other a frequency *c*. As in the previous description these frequencies are impressed on the conductors 297 and 298 during the time relay 229 was unoperated and incident to the operation of relay 408 and are transmitted over conductors 297 and 298, link conductors 640 and 641 to conductors 701 and 702, the two lower front contacts of relay 703 to the terminals of windings 717 and 718 of the hybrid coil H. These frequencies thence are transmitted to the conductors 730 extending from the hybrid coil H to the receiver ACR and are employed to unlock the receiver in the manner hereinbefore described.

The calling subscriber obviously may deposite coins in various combinations in payment of the overtime charges. For example, he may use six nickels, three dimes, a quarter and a nickel and any combination of nickels and dimes totaling thirty cents. In view of the detailed description hereinbefore made in connection with the deposit of a dime for the initial period and also of the more comprehensive description contained in my copending application, hereinbefore identified, it is deemed not necessary to repeat in detail the operation of the overtime charges by the calling subscriber. Suffice it to say that depending upon the manner in which the subscriber elects to pay the thirty cents tariff, that is in six nickels, three dimes, etc. corresponding groups of frequencies *a—f*, *b—f* and/or *c—f* are transmitted over the connection to cause the alternating-current receiver ACR to respond accordingly and to correspondingly control the operation of the coin register and adding circuit (Fig. 8).

It has been described hereinbefore that when the called subscriber disconnected at the end of the first overtime period the time lead 1419 was grounded by way of the brush of arc 6 of the timing switch TM and that this resulted in the operation of charge relay 750 which causes the telegraphone 721 to transmit its overtime charge message to the calling subscriber. This same ground potential was also applied to terminal 950 of arc T3 of the switch T (Fig. 9). Under control of the coin register and adding circuit the switches AIS and T are caused to operate in accordance with the information relayed to the coin register and adding circuit by the alternating-current receiver ACR incident to the deposit of coins in the amount of thirty cents at the calling station 100 in payment of the overtime charges.

If the brush of arc T3 of switch T advances to the terminal 950 indicating the deposit of an amount corresponding to the amount requested by the telegraphone 721 the connection will be released following the disconnection of the calling subscriber.

If the calling subscriber fails to deposit coins in the amount requested by the telegraphone 750 the monitoring operator is brought in on the connection as described hereinbefore under the heading "Timing-Out Circuit TS." Under this condition the operator may take whatever steps may be required.

Should the calling party disconnect without depositing the overtime charges the calling supervisory relay 213 would release. Relay 1522 (Fig. 15) operated initially when relay 401 operated, the operating circuit being traced from grounded battery, through the winding of relay 1522, conductor 1523, No. 3 normally closed contacts of relay 598, conductor 1524, to ground at the No. 1 contacts of relay 401. When relay 598 operated, as described, relay 1522 is held operated directly to ground at the lower contacts of calling supervisory relay 213. Relay 1522 is made slow to release to prevent false release due to line surges.

When relay 213 releases indicating a calling party disconnect, relay 1522 releases causing relay 1501 to operate in a circuit which may be traced from grounded battery, through the winding of relay 1501, the No. 4 contacts of relay 1526, contacts 1528 of relay 1529, back contacts of relay 1522, conductor 1511, to ground by way of the No. 5 contacts of relay 598.

Relay 1501, operated, connects the ringing current source 1530 to the calling line conductor by way of the winding of trip relay 1531, the front contact and outer upper armature of relay 1501 and conductor 1503 and thence over the established connection to the calling station 100. Thus, the ringer or audible signal at station 100 is actuated steadily.

At its outer lower front contacts relay 1501 causes relay 1533 to operate in a circuit which includes contacts 1525 of relay 1529, left contacts of interrupter 1532, the winding of relay 1533 and battery and ground. Relays 1533 and 1534 and the interrupter 1532 start a timing period of several seconds. Relay 1533, operated, causes relay 1534 to operate when the right contact of interrupter 1532 closes, it being apparent that relay 1533 locks operated independent of the interrupter contacts. Relay 1534 locks to ground at the No. 7 contacts of relay 401 and at its outer upper armature and front contact connects ground to conductor 698 to indicate that the monitoring operator is to be brought into the connection as soon as the coin control circuit is connected.

If the calling party answers before relay 1534 operates, relay 1531 operates which causes relay 1529 to operate. Relay 1529, operated, releases relay 1501 which disconnects the ringing source 1530 from the calling line and reestablishes the talking conductors.

When relay 1534 operated, relay 1529 operated by way of the right contacts of interrupter 1532 and in operating locks to ground at the inner lower front contacts of relay 1501 and causes relay 1526 to operate. Relay 1501, as above described, releases to disconnect the ringing current from the line and to reestablish the talking conductors. Relay 1526 operates to start the overtime collection. Relay 1501, while operated, holds the trunk circuit by holding relay 403 operated.

Relay 1526 in operating, closes an operating circuit for relay 217 which may be traced from grounded battery, through the winding of relay 217, conductor 275, No. 3 contacts of relay 1526, conductor 1540, the No. 2 contacts of relay 401, to ground at the No. 2 front contacts of relay 407. Relay 217, at its inner contacts, connects battery to the link start lead 222 which, as previously described, operates the link preference relay 624. Thus, the link L is again seized in a manner already described and extends the trunk to the coin control circuit.

The ground connected to the lead 698 incident to the operation of relay 1534 now extends by way of armature *h* and front contact of relay 626, conductor 699, front contact and armature *i* of relay 630, conductor 799, back contact and armature of relay 725, conductor 726, to ground through the winding of relay 724.

At the same time the locking circuit for charge relay 518 is opened permitting this relay to release. The coin collect voltage 529 is switched through a make contact on relay 400 and a path prepared for relay 412 to operate so that any coins deposited will be collected when the circuit releases.

*Gradual rate change*

The gradual rate change circuit shown primarily on Fig. 13 has for its purpose to enable a change to take place in the charge rates for different telephone calls in such a manner that calls originating prior to the change and in progress at the time the rates are changed, will have their charges computed at the rates which were in effect prior to the change.

When a trunk requires the charges for a call to be computed, trunk preference relay 624 is operated, as previously described, to start the setting up of a link such as the link L. Relays 626 and 1202 are operated, as described, the latter relay cutting through the "time" leads such as 1404 and 1419 and the "rate" leads such as 1403 from the trunk to the common coin controlled pronouncement circuit (Fig. 7). Leads such as 1404 and 1419 are grounded during the established connection to indicate the length of time the call is being charged for and the lead 1403 the rate which the call is to be charged.

Assuming all relays of the gradual rate change circuit, which includes such relays as 1205 and 1206, are in their normal illustrated conditions, high rate relay 1205 is operated and low rate relay 1206 is released. The operating circuit for relay 1205 may be traced from grounded battery through the winding of relay 1205, to ground by way of the outer lower armature and back contact of relay 1301.

The grounded "rate" lead 1403 extends over armature *a* of relay 1202 and its front contacts, conductor 1204, the No. 4 front contacts of relay 1205, the No. 4 back contacts of relay 1206, to grounded battery through the winding of relay 1303.

The grounded "time" lead 1404, assuming the call is in the first five minutes of the initial period, extends over armature *b* of relay 1226 and its front contact, condutcor 1206, the No. 1 armature contacts of relay 1303, the upper back contacts of relay 1304, to grounded battery through the winding of relay 1301.

When relay 1301 operates, the operating circuit for relay 1205 is opened and this relay releases as does also relay 1303. When relay 1205 releases, rate relay 1203 of the charge rate translator circuit operates, as hereinbefore described, and operates relay 1207. Relay 1305 now operates in an obvious circuit which includes the lower contacts of relay 1207. With relay 1305 operated, slow-to-release relay 1306 operates in an obvious circuit, the former completing a locking circuit for relay 1301 which may be traced from grounded battery through the winding of relay 1301 and its upper armature contacts, the inner lower armature and back contact of relay 1302, the No. 5 back contacts of relay 1307, to ground by way of the upper contacts of relay 1305.

When relay 1202 releases, as previously described, the rate relay 1203 releases causing the release of relays 1207 and 1305. Relay 1301 releases during the time when relay 1305 is released and relay 1306 operated. Relay 1205 again operates and the above-described cycle is repeated on all succeeding calls.

At the time assigned to changing the rates from the higher to a lower value the clock contact 1308 controlled by interrupter 1309 is closed causing the operation of "rate change" relay 1310 in an obvious circuit and, in turn, the operation of relay 1311 in an equally obvious circuit.

At the same time a one-minute clock contact 1312 is closed by the interrupter 1313 causing the operation of relay 1314. This clock contact is cyclically closed every minute for an interval of a few seconds. With relay 1314 operated, relay 1315 operates in a circuit extending from grounded battery, through the winding of relay 1315, lower back contacts of relay 1316, the outer upper contacts of relay 1317, the No. 2 back contacts of relay 1307, the inner front contacts of relay 1310, terminal No. 1 of arc TM1 and the associated brush of switch 1TM to ground by way of the armature contacts of relay 1314.

Relay 1315, operated, energizes the step magnet 1318 of the switch 1TM. At the end of the one-minute clock closure by contact 1312, relay 1314 releases, releasing relay 1315, which in turn causes the opening of the circuit to the switch magnet 1318. The switch 1TM accordingly takes one step.

In position 2 of switch 1TM one minute later, relay 1314 again operates causing the operation of relay 1307 in a circuit extending from grounded battery through resistance 1319, winding of relay 1307, normally closed No. 1 contacts of relay 1307, a No. 2 terminal of arc TM1 of switch 1TM and its associated brush, to ground by way of the contacts of relay 1314.

Relay 1307, operated, operates relay 1315 in a circuit which includes the lower normal contacts of relay 1316, the lower front contacts of relay 1307, the No. 2 terminal of arc TM1 of switch 1TM and its associated brush, and the armature contacts of relay 1314. Relay 1307 also opens the locking circuit of relay 1301 causing this relay to release and to operate relay 1304 in a circuit which is traced from grounded battery through resistance 1320, winding of relay 1304, terminal No. 2 of arc TM2 of switch 1TM and its associated brush, to ground by way of the No. 3 front contacts of relay 1307. Relay 1304 locks directly to ground by way of its lower contact.

When the one-minute clock contact 1312 opens, relay 1314 releases causing relay 1315 to release. Switch magnet 1318 deenergizes and the switch 1TM steps to the third position and relay 1316 operates by way of the No. 1 contacts of relay 1307.

At each closure of clock contact 1312, relays 1314 and 1315 operate, the latter energizing switch magnet 1318. When the contact opens, the switch magnet is deenergized and the switch 1TM steps. The next relay 1321 then operates transferring its "time" lead to relay 1302. This continues until all relays such as relays 1304, 1321—1322 and 1323 operate. When the switch 1TM reaches position 1, relay 1315 may no longer operate as its energizing path is opened at the inner contacts of relay 1310.

After a predetermined interval of time, usually nine hours, has elapsed during which the low charge rates prevail, time contact 1308 closes, operating relay 1310 which, in turn, releases relay 1311. With the next closure of the one-minute clock contact 1312, relays 1314 and 1315 operate preparing to step switch 1TM to position 2 to which position it steps upon the release of relay 1314. The next closure of contact 1312 causes relay 1307 to release which causes relay 1304 to release by grounding the No. 2 terminal of arc TM3 of the switch 1TM and shunting the relay. In this manner the low rates are gradually changed to high rates as the relays 1304, 1321—1322 and 1323 release, permitting "time" lead ground to operate relay 1301.

If a trunk now seizes the link circuit (Fig. 12), relay 1205 being operated by the release of relay 1301, causes the operation of relay 1303. If the grounded "time" lead runs through the upper front contacts of relay 1304, rather than through corresponding contacts of similar relays 1321—1322 and 1323, indicating a call of only one minute duration while the new rate has been in effect, relay 1302 is operated, in turn, operating "low rate" relay 1206 and causing the grounded "rate" lead such as 1403 to operate a different charge rate translator relay such as 1229 and the call to be charged at the lower rate. Relay 1302 is held operated until relays 1207 and 1305 release as previously described.

If, however, any of the other "time" leads had been grounded, relay 1301 would have been operated, since their corresponding relays 1321—1322 and 1323 would not be operated. In this case, the high rate relay 1205 is released and operates the high rate translator relay such as relay 1203. Thus, any call which has been in progress prior to the operation of the rate change contact 1308, will be charged at the rate which prevailed at the time the call was initiated. Any call, however, which originates after the rate change goes into effect will be charged at the new rate, that is, at the rate which prevailed at the time the call was initiated. Relays 1207, 1305, 1306 and 1310 function as before.

The "no rate change" key NRC (Fig. 13) is provided for operation on Sundays or other times when it is not required to change the charge rate for calls originated at certain times during the day.

Other circuit features inherent in the operation of the circuit need not be described in this application since they are set forth in detail in the aforenoted C. E. Brooks et al. patent and are not essential to a complete understanding of the present invention.

Figs. 16 and 17 illustrate a standard type of telephone coin collector modified to accommodate the coin signal generator employed in the system embodying the features of the present invention and which is shown schematically at the extreme left of Fig. 1. The metallic housing 1622 supports the coin runways or passages indicated generally at 1623 in any suitable manner as shown, for example, in O. F. Forsberg Patent 1,043,219 of November 5, 1912. The upper ends of the several coin runways or passages project through the top of the metallic housing and terminate in openings 1605, 1610 and 1625 in the plate 1629. These openings are of sizes properly to receive a five-cent coin, a ten-cent coin and a quarter-dollar coin, respectively. The coins deposited in these openings traverse the coin runways in well-known manner for ultimate deposit in the coin hopper, not shown. The five-cent coin runway is so formed as to cause the coin deposited therein to strike the lower edge of the bell 1624; the ten-cent coin runway is so designed as to cause the coin deposited therein to strike the bell 1624 at both its upper and lower edges; and the quarter-dollar coin runway is so designed as to cause the coin deposited therein to strike the gong, or signal 1626. The gong 1626 and the bell 1624 are suitably supported by the metallic housing 1622.

Supported between the two side walls of the housing 1622 near the upper extremities thereof is a cross-bar or shelf-like bracket 1606 which carries three units 1607, 1608 and 1609 of a signal generator, each of which consists of a coil and a pair of vibratable reeds. These units are secured to the bracket 1606 by screws, as illustrated, in such positions relative to the upper openings 1631, 1632 and 1633 of the coin runways that the vibratable reeds 1614 project thereacross so as to be engaged by the coins in their passage to the runways. Thus the reeds are caused to vibrate when engaged by the deposited coins and to generate in the coils 1435 (Fig. 1) tone signals of the frequencies hereinbefore referred to in the description of the overall system.

What is claimed is:

1. In a telephone system, a central office, a telephone line having a coin box station thereon, a trunk circuit, a telegraphone at said central office carrying a pronouncement indicative of the cost of the initial period of a call extended from said coin box station over said trunk circuit, means responsive to the seizure of said trunk circuit incident to the origination of a call at said coin box station for connecting said telegraphone to said trunk, means responsive to the deposit at said station of coins in the amount indicated by said telegraphone for completing the originated call to a called station and for disconnecting said telegraphone from said trunk circuit, a second telegraphone bearing a pronouncement of warning that the initial period is about to terminate, and means effective a predetermined interval of time prior to the termination of the initial period of the originated call for connecting said second telegraphone to said telephone line for a timed interval.

2. In a telephone system, a central office, a telephone line having a coin box station thereon, a trunk circuit, a telegraphone at said central office bearing a pronouncement indicative of the cost of the initial period of a call extended from said coin box station over said trunk circuit, means responsive to the seizure of said trunk circuit incident to the origination of a call at said coin box station for connecting said telegraphone to said trunk, means responsive to the deposit at said station of coins in the amount indicated by said telegraphone for completing the originated call to a called station, a second telegraphone bearing a pronouncement of warning that the first overtime perior for the originated call is about to begin and that a tone signal will be transmitted to the calling station a predetermined interval of time preceding the start of each subsequent overtime period, a source of tone, means effective a predetermined interval of time prior to the start of the first overtime period of the originated call for connecting said second telegraphone to said telephone line, and means for connecting said source of tone to said line a predetermined interval of time preceding the start of each subsequent overtime period.

3. In a telephone system, a central office, a telephone line having a coin box station thereon, a group of trunk circuits, a timing switch individual to each of said trunk circuits, a charge rate translation link circuit common to said trunks and responsive to various settings of said timing switch in accordance with the time duration of a call extended from said line by way of one of said trunks to indicate the charges for the call for different time periods, means operated upon initiation of a call at said station for connecting said line to one of said trunks, a coin controlled pronouncement circuit including telegraphones bearing pronouncements indicative of various charges, said pronouncement circuit being accessible by way of said common link circuit, a link circuit individual to each of said trunks adapted to associate said coin controlled pronouncement with the corresponding trunk circuit, means effective incident to the response of a called subscriber to a call originated at said station for causing said timing switch to operate and mark said translation circuit in accordance with the time duration of the initial charge period for said call and to seize said coin controlled pronouncement circuit, and means effective incident to the seizure of said coin controlled pronouncement circuit for releasing said common translation link and seizing said trunk circuit by way of said individual link whereby the pronouncements carried by the telegraphones of said coin controlled pronouncement circuit are transmitted to said coin box station by way of said individual link.

4. In a telephone system, a subscriber's line, means for extending calls having initial and overtime periods from said line into different tariff zones including a trunk having a terminal appearance identifying each tariff zone, a group of tariff pronouncement devices certain of which correspond to the terminal appearances of said trunk and each of which bears a request pronouncement for a different tariff, means for seizing said trunk by way of any of its terminal appearances incident to the initiation of a call over said subscriber's line, means responsive to the seizure of said trunk by way of one of its terminal appearances for connecting a corresponding one of said certain tariff pronouncement devices to said trunk, means for measuring the total time duration of the initiated call beyond the initial period thereof, and means controlled by said timing means and effective incident to the termination of the initiated call for connecting a different one of said telegraphones to said trunk.

5. In a telephone system, a subscriber's line, means for extending calls from said line into different tariff zones in which the charge rate for each overtime period is different than the charge rate for the initial period, said means including a trunk having a terminal appearance identifying each tariff zone, a group of tariff pronouncement devices each bearing a different tariff request pronouncement, means for seizing said trunk by way of any of its terminal appearances incident to the initiation of a call over said subscriber's line, means responsive to the seizure of said trunk by way of one of its terminal appearances for connecting to said trunk a tariff request pronouncement device bearing a tariff request pronouncement indicative of the tariff for the initial period of the initiated call, and means effective incident to the termination of the initiated call for automatically connecting to said trunk a tariff request pronouncement device bearing a tariff request pronouncement indicative only of the total overtime charges for the initiated call.

6. The telephone system defined by claim 5 in which the last said means includes a switch for measuring the time consumed in overtime on the initiated call.

7. In a telephone system, a subscriber's line, means comprising a trunk for extending calls from said line into different tariff zones for a time interval consisting of an initial period and subsequent overtime periods of predetermined lengths, a message bearing device, a source of tone, means effective a predetrmined time before the termination of the initial period of said call for automatically connecting said message bearing device to said trunk to advise the subscriber on said line that the first overtime period is about to begin, and means effective a predetermined time prior to the termination of each overtime period of said call for automatically connecting said source of tone to said trunk.

8. In a telephone system, a calling subscriber's line, a called subscriber's line, means comprising a trunk for extending a call from said calling line to said called line, a telegraphone bearing a tariff request pronouncement indicative of the charge rate for the initial period of said call, a plurality of other telegraphones each bearing a different tariff request pronouncement, means responsive to the seizure of said trunk incident to the initiation of a call on said calling line for automatically connecting said first telegraphone to said trunk to advise the calling subscriber of the charge rate for the initial period of said call, means for timing subsequent overtime periods of said call, and means controlled by said timing means and effective only upon disconnect by the called subscriber for connecting one of the other telegraphones to said trunk to advise the calling subscriber of the total overtime charges for said call.

9. In a telephone system, a calling subscriber's line, a called subscriber's line, means comprising a trunk for extending a call from said calling line to said called line, a telegraphone bearing a tariff request pronouncement indicative of the charge rate for the initial period of said call, a plurality of other telegraphones each bearing a different request pronouncement, means responsive to the seizure of said trunk incident to the initiation of said call on said calling line for automatically connecting said first telegraphone to said trunk to advise the calling subscriber of the charge for the initial period of said call, means for timing subsequent overtime periods of said call, means controlled by said timing means and effective upon disconnect by the called subscriber only for connecting one of the other telegraphones to said trunk to advise the calling subscriber of the total overtime charges for said call, a source of ringing current, and means effective upon a disconnect by the calling subscriber for connecting said source of ringing current to said trunk.

10. In a telephone system, a calling subscriber's line, a trunk circuit, means for extending calls from said line over said trunk, means for charging the calling line at one rate for one call extended over said trunk, means for charging the calling line at another rate for another call extended over said trunk, means for determining which of said charging means prevails in accordance with which of two time periods the call is initiated in, means for rendering only the charging means corresponding to the time period in which a call is initiated effective on a call overlapping both said time periods, and means effective at the termination of the call for orally advising the subscriber on said line of the charges for only a portion of said call.

11. In a telephone system, a calling subscriber's line having a coin box station thereon, a trunk circuit, means for extending calls from said line over said trunk for a time interval made up of initial and overtime periods, means for charging a calling line for the call at either of two rates depending on which of two time periods the call is initiated in, means effective upon the completion of a call extended over said trunk for orally advising the calling subscriber of the charges for the initial period for said call, means effective prior to the termination of the initial period for automatically collecting the charges deposited in the coin box at the station on said line for the said initial period and for orally advising the calling subscriber that an overtime period is about to start, means for rendering effective the said charging means corresponding to the time period in which said call is initiated, means capable of changing the charge rate for calls subsequently initiated at said station during the pendency of the said initiated call, and means for rendering only the charge rate in effect at the time the said call was originated effective on the said initiated call.

References Cited in the file of this patent

UNITED STATES PATENTS

| | | |
|---|---|---|
| 1,917,884 | Hague | July 11, 1933 |
| 2,000,804 | Wehren | May 2, 1935 |
| 2,082,561 | Appelius | June 1, 1937 |
| 2,357,576 | Brooks et al. | Sept. 5, 1944 |
| 2,385,061 | Clark | Sept. 18, 1945 |
| 2,602,119 | McCarthy | July 1, 1952 |

FOREIGN PATENTS

| | | |
|---|---|---|
| 604,547 | Great Britain | July 6, 1948 |